(12) United States Patent
Yousef et al.

(10) Patent No.: US 7,068,742 B2
(45) Date of Patent: Jun. 27, 2006

(54) METHOD AND APPARATUS FOR RESOLVING MULTIPATH COMPONENTS FOR WIRELESS LOCATION FINDING

(75) Inventors: Nabil R. Yousef, Los Angeles, CA (US); Ali H. Sayed, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 312 days.

(21) Appl. No.: 10/214,934

(22) Filed: Aug. 7, 2002

(65) Prior Publication Data

US 2003/0081659 A1 May 1, 2003

Related U.S. Application Data

(63) Continuation of application No. PCT/US01/04287, filed on Feb. 9, 2001.

(60) Provisional application No. 60/181,892, filed on Feb. 11, 2000.

(51) Int. Cl.
*H04L 1/02* (2006.01)
*H04B 7/10* (2006.01)

(52) U.S. Cl. .................... 375/343; 375/148

(58) Field of Classification Search ............... 375/142, 375/143, 144, 148, 149, 150, 260, 285, 343, 375/346, 348, 349, 350, 152; 455/63.1, 65, 455/296, 303, 307; 370/335, 342
See application file for complete search history.

(56) References Cited

U.S. PATENT DOCUMENTS

| | | | |
|---|---|---|---|
| 4,106,023 A | 8/1978 | Baghdady | 342/405 |
| 4,595,925 A | 6/1986 | Hansen | 342/123 |
| 5,181,039 A | 1/1993 | Oswald et al. | 342/119 |
| 5,528,232 A | 6/1996 | Verma et al. | 340/825.49 |
| 5,640,423 A * | 6/1997 | Archer | 375/261 |
| 5,646,958 A | 7/1997 | Tsujimoto | 375/233 |
| 5,648,983 A | 7/1997 | Kostic et al. | 375/150 |
| 5,719,899 A | 2/1998 | Thielecke et al. | 375/144 |
| 5,784,364 A | 7/1998 | Ahn et al. | 370/335 |
| 5,841,288 A | 11/1998 | Meaney et al. | 324/639 |
| 5,844,951 A | 12/1998 | Proakis et al. | 375/347 |
| 5,894,473 A | 4/1999 | Dent | 370/342 |
| 5,970,414 A | 10/1999 | Bi et al. | 455/456 |
| 6,215,814 B1 * | 4/2001 | Ylitalo et al. | 375/148 |
| 6,587,501 B1 * | 7/2003 | Yu | 375/147 |
| 6,671,338 B1 * | 12/2003 | Gamal et al. | 375/346 |

FOREIGN PATENT DOCUMENTS

WO     WO 00/16494     3/2000

* cited by examiner

*Primary Examiner*—Kenneth Vanderpuye
*Assistant Examiner*—Kevin Kim
(74) *Attorney, Agent, or Firm*—John P. O'Banion

(57) ABSTRACT

A method and apparatus that provides an accurate estimate of the time and amplitude of arrival of the first arriving overlapping multipath components (rays) in wireless locating finding systems. Overlapping fading multipath components for mobile-positioning are resolved by exploiting the fact that multipath components fade independently. Although fast channel fading is usually considered a challenge to the location finding process, it is used as an additional tool to detect and resolve overlapping multipath rays. A projection technique is also provided that exploits all possible a-priori channel information into a adaptive filtering algorithm, thus providing needed robustness to divergence of the adaptive algorithm that might result from possible severe data matrix ill-conditioning and high noise levels, which are common in wireless location applications.

26 Claims, 21 Drawing Sheets

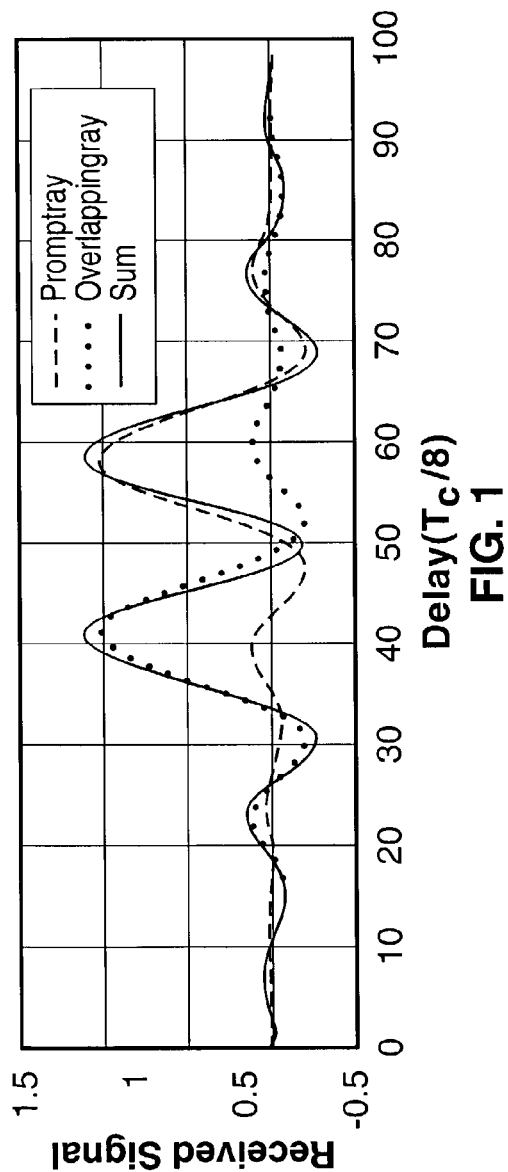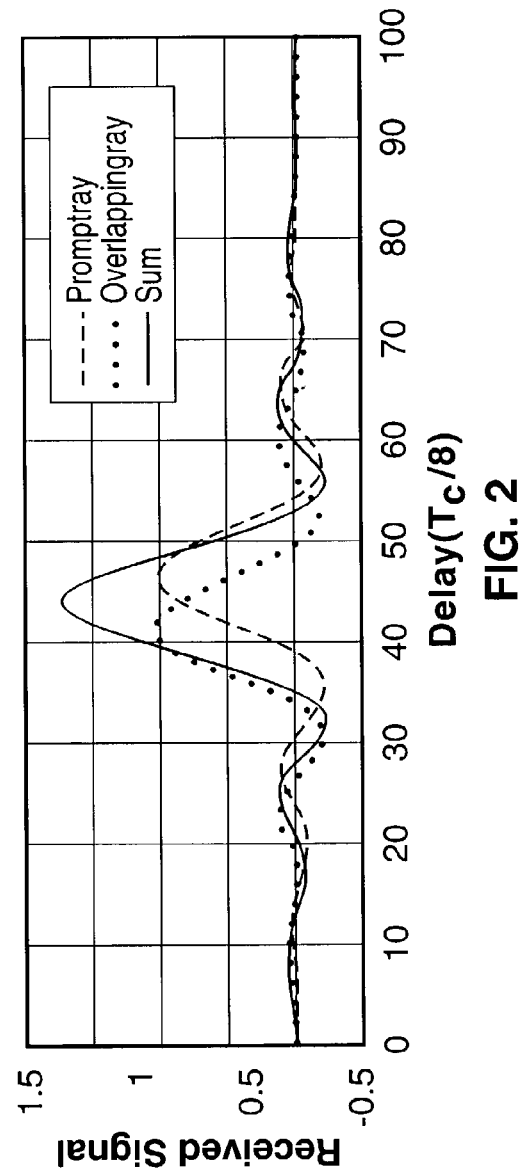

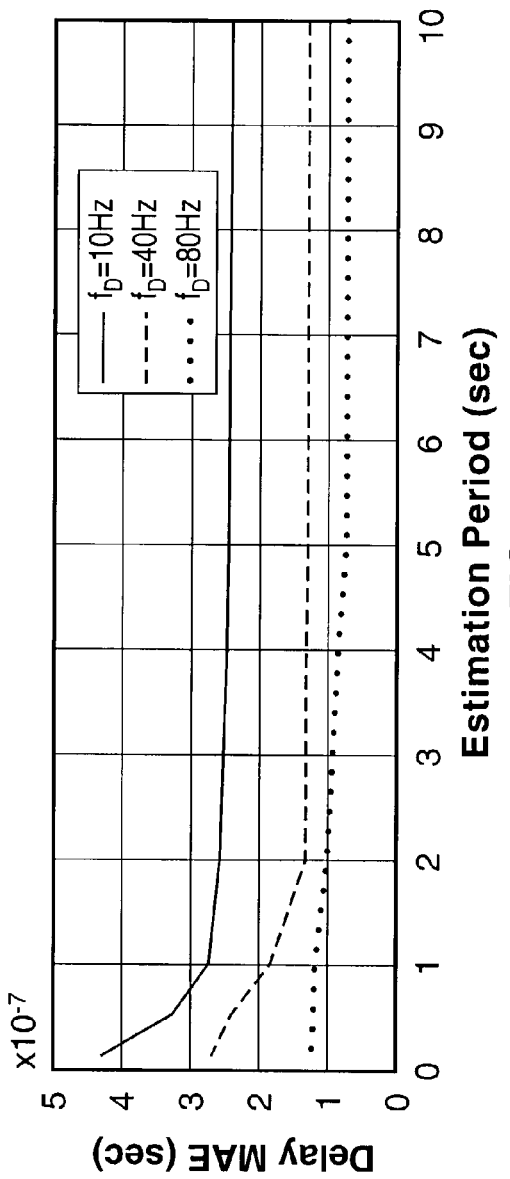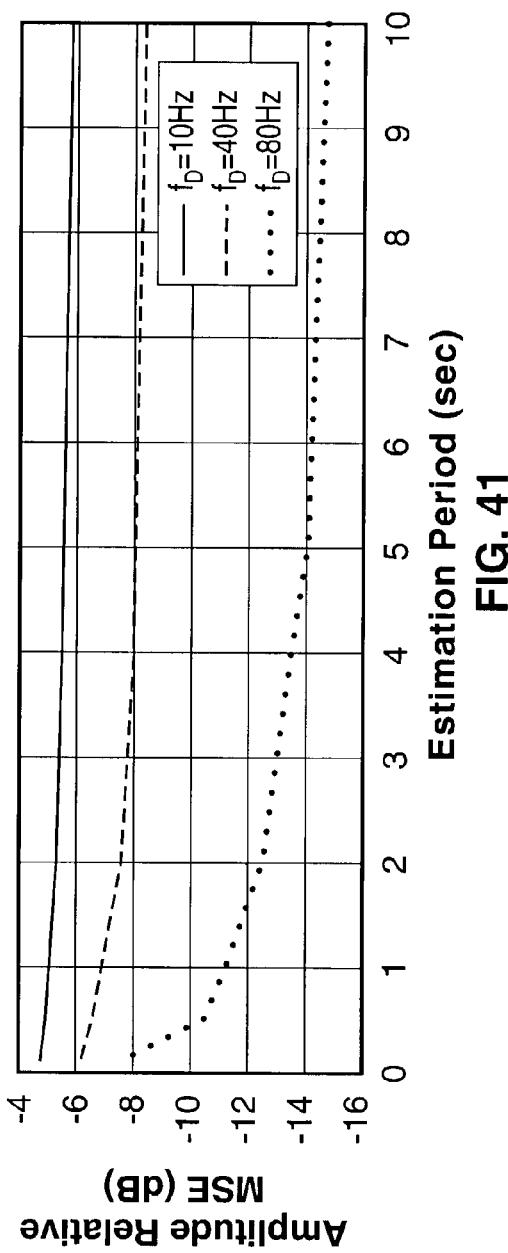

METHOD AND APPARATUS FOR RESOLVING MULTIPATH COMPONENTS FOR WIRELESS LOCATION FINDING

CROSS-REFERENCE TO RELATED APPLICATIONS

This application claims priority from, and is a 35 U.S.C. § 111(a) continuation of, co-pending PCT international application serial number PCT/US01/04287 filed on Feb. 9, 2001 which designates the U.S. This application also claims priority to U.S. provisional application Ser. No. 60/181,892 filed on Feb. 11, 2000.

STATEMENT REGARDING FEDERALLY SPONSORED RESEARCH OR DEVELOPMENT

This invention was made with Government support under Grant Nos. CCR-9732376 and ECS-9820765, awarded by the National Science Foundation. The Government has certain rights in this invention.

REFERENCE TO A MICROFICHE APPENDIX

Not Applicable

BACKGROUND OF THE INVENTION

1. Field of the Invention

The present invention pertains generally to wireless locating finding methods and systems, and more particularly to a method and apparatus for detecting multipath components, estimating the number of overlapping multipath components, and providing an accurate estimate of the time and amplitude of arrival of the first arriving overlapping multipath components (rays). Such resolving is vital for obtaining an accurate location estimate in wireless-location finding systems.

2. Description of the Background Art

Wireless location finding or simply "wireless location" refers to obtaining the position information of a mobile subscriber in a cellular environment. Such position information is usually given in terms of geographic coordinates of the mobile subscriber with respect to a reference point. Wireless location is also commonly termed mobile-positioning, radiolocation, and geolocation.

Wireless location is an important public safety feature of future cellular systems since it can add a number of important services to the capabilities of such systems. Among these services and applications of wireless location are:

(a) E-911. A high percentage of emergency 911 (E-911) calls nowadays come from mobile phones. However, these wireless E-911 calls do not get the same quality of emergency assistance that fixed-network E-911 calls enjoy. This is due to the unknown location of the wireless E-911 caller. To face this problem, the Federal Communications Commission (FCC) issued an order on Jul. 12, 1996, which required all wireless service providers to report accurate mobile station (MS) location to the E-911 operator at the public safety answering point (PSAP). According to the FCC order, it is mandated that within five years from the effective date of the order (Oct. 1, 1996), wireless service providers must convey to the PSAP the location of the MS within 100 meters of its actual location for at least 67 percent of all wireless E-911 calls (the original requirement was 125 meters, but was later tightened to 100 meters). It is also expected that the FCC will further tighten the required location accuracy level in the recent future. This FCC mandate has motivated research efforts towards developing accurate wireless location algorithms.

(b) Location sensitive billing. Using accurate location information of wireless users, wireless service providers can offer variable-rate call plans that are based on the caller location. For example, the cell-phone call rate might vary according to whether the call was made at home, in the office, or on the road. This will enable wireless service providers to offer competitive rate packages to those of wire-line phone companies.

(c) Fraud protection. Cellular phone fraud has attained a notorious level, which serves to increase the usage and operation costs of cellular networks. This cost increase is directly passed to the consumer in the form of higher service rates. Furthermore, cellular fraud weakens the consumer confidence in wireless services. Wireless location technology can be effective in combating cellular fraud since it can enable pinpointing perpetrators.

(d) Person/asset tracking. Wireless location technology can provide advanced public safety applications including locating and retrieving lost children, Alzheimer patients, or even pets. It could also be used to track valuable assets such as vehicles or laptops that might be lost or stolen. Furthermore, wireless location systems could be used to monitor and record the location of dangerous criminals.

(e) Fleet management. Many fleet operators, such as police force, emergency vehicles, and other services including shuttle and taxi companies, can make use of the wireless location technology to track and operate their vehicles in an efficient way in order to minimize response times.

(f) Intelligent transportation systems. A large number of drivers on road or highways carry cellular phones while driving. The wireless location technology can serve to track these phones, thus transforming them into sources of real-time traffic information that can be used to enhance transportation safety.

(g) Cellular system design and management. Using information gathered from wireless location systems, cellular network planners could improve the cell planning of the wireless network based on call/location statistics. Improved channel allocation could be based on the location of active users.

(h) Mobile yellow pages. Based on the available location information, a mobile user could obtain road information of the nearest resource the user might need such as a gas station or a hospital. Thus, a cellular phone will act as smart handy mobile yellow pages on demand. Furthermore, the cellular user could obtain real-time traffic information based on location.

Wireless location technologies fall into two main categories: mobile-based and network-based techniques. In mobile-based location systems, the mobile station determines its own location by measuring signal parameters of an external system, which can be the signals of cellular base stations or satellite signals of the Global Positioning System (GPS). On the other hand, network-based location systems determine the position of the mobile station by measuring its signal parameters when received at the network cellular base stations. Thus, in the later type of wireless location systems, the mobile station plays no role in the location process.

Mobile-Based Wireless Location

GPS Mobile-based Location Systems:

In GPS-based location systems, the MS receives and measures the signal parameters of at least four different satellites of a currently existing network of 24 satellites that circle the globe at an altitude of 20,000 Km and which constitute the Global Positioning System (GPS). Each GPS satellite transmits a binary code, which greatly resembles a code division multiple access (CDMA) code. This code is multiplied by a 50 Hz unknown binary signal to form the transmitted satellite signal. Each GPS satellite periodically transmits its location and the corresponding time-stamp, which it obtains from a highly accurate clock that each satellite carries.

The satellite signal parameter, which the MS measures for each satellite, is the time the satellite signal takes until it reaches the MS. Cellular handsets usually carry a less accurate clock than the satellite clock. To avoid any errors resulting from this clock inaccuracy, the MS time-stamp is often added to the set of unknowns that need to be calculated, thus making the number of unknowns equal to four (three MS position coordinates plus time-stamp). This is why four satellite signal parameters have to be measured by the MS.

After measuring the satellite signal parameters, the MS can proceed in one of two manners. The first is to calculate its own position and then broadcast this position to the cellular network. Processing the measured signal parameter to obtain a position estimate is known as data fusion. In the other scenario, the MS broadcasts the unprocessed satellite signal parameters to another node (or server) in which the data fusion process is performed to obtain an estimate of the MS position. The later systems are known as server-aided GPS systems, while the first are known as pure GPS systems.

In server-aided GPS location systems, the server (or the node that interacts with the mobile) can also perform the following tasks, in addition to data fusion:

(a) The server broadcasts a list of all GPS satellites in view of handsets within its vicinity, along with the relative Doppler offset of each satellite. Such information can help reduce the time and accuracy of the MS measurement. For example, a regular GPS receiver can take up to several minutes to lock onto GPS satellites in site, while it takes a few seconds to estimate the satellite signal parameters. Thus, in a server-aided scenario, the time and power needed by the MS to estimate the GPS satellite signal parameters are dramatically reduced.

(b) If the server has access to terrain altitude database, it can provide this information to the MS. This reduces the number of unknown parameters to three instead of four, which translates to a higher location accuracy if four satellite measurements are available.

(c) The server node can contain a reference GPS receiver, with an antenna at a precisely known location and a clock of a similar accuracy to that of the satellites. This reference GPS receiver estimates certain parameters of the GPS satellite signals and then broadcasts this data in the form of aiding data (or corrections) to all mobile stations in its vicinity. This correction data can be exploited by the MS to increase its location estimation accuracy. This technique is generally known as Differential GPS (DGPS). The aiding data can include correction data for multipath and reflection effects, satellite 50 Hz data, atmospheric delays, and any deliberate error enforced by the GPS satellite network. These corrections become less accurate with increasing distance between the MS and the server as well as with increasing period between consecutive server correction broadcasts.

(d) Finally, the server uses the MS satellite estimated parameters to determine the MS location and then conveys this information to the public safety answering point (PSAP) that requested the location information.

The server-aided GPS approach is successful in a microcell cellular environment, where the diameter of cellular cells is relatively small (few hundred meters to few km). This environment is common in urban areas. On the other hand, in macrocell environments, which are common in suburban or rural areas, base stations, and thus servers, are widely spread out. This increases the average distance between the MS and the server leading to ineffective correction information. This is why, in many mobile-based GPS location system designs, handsets have to support both server-aided GPS and pure GPS location modes of operation.

GPS-based mobile location systems have the following advantages. GPS receivers usually have a relatively high accuracy, which can reach less than 10 meters with DGPS server-aided systems. Moreover, the GPS satellite signals are available all over the globe, thus providing global location information. Finally, GPS technology has been studied and enhanced for a relatively long time and for various applications, and is a rather mature technology. Despite these advantages, wireless service providers may be unwilling to embrace GPS fully as the principal location technology due to the following disadvantages of GPS-based location systems:

(a) Embedding a GPS receiver in the mobile handset directly leads to increased cost, size, and battery consumption of the mobile handset.

(b) The need to replace hundreds of millions of handsets that are already in the market with new GPS-aided handsets. This will directly impact the rates the wireless carriers offer their users and can cause considerable inconvenience to both users and carriers during the replacement period.

(c) The degraded accuracy of GPS measurements in urban environments, when one or more satellites are obscured by buildings, or when the mobile antenna is located inside a vehicle.

(d) The need for handsets to support both server-aided and pure GPS modes of operation, which increases the average cost, complexity and power consumption of the mobile handset. Furthermore, the power consumption of the handset can increase dramatically when used in the pure GPS mode. Moreover, the need to deploy GPS aiding servers in wireless base stations adds up to the total cost of GPS-aided location systems.

(e) GPS-based location systems face a political issue raised by the fact that the GPS satellite network is controlled by the U.S. government, which reserves the right to shut GPS signals off to any given region worldwide. This might make some wireless service providers outside the U.S. unwilling to rely solely on this technology.

Cellular Mobile-based Location Systems:

Cellular mobile-based wireless location technology is similar to GPS based location technology, in the sense that the MS uses external signals to determine its own location. However, in this type of location systems, the MS relies on wireless signals originating from cellular base stations. These signals could be actual traffic cellular signals or special purpose probing signals, which are specifically broadcast for location purposes. Although this approach, which is also known as forward link wireless location, avoids the need for GPS technology, it has the same disadvantages that GPS location systems have, which is the need to modify existing handsets, and may even have increased handset power consumption over that of the GPS solution. n addition, this solution leads to lower location accuracy than that of the GPS solution. This makes cellular mobile-based location systems less favorable to use by wireless service providers.

Network-Based Wireless Location

Network-based location technology depends on using the current cellular network to obtain wireless users location information. In these systems, the base stations (BSs) measure the signals transmitted from the MS and relay them to a central site for processing and calculating the MS location. The central processing site then relays the MS location information to the associated PSAP. Such a technique is also known as reverse link wireless location. Reverse link wireless location has the main advantage of not requiring any modifications or specialized equipment in the MS handset, thus accommodating a large cluster of handsets already in use in existing cellular networks. The main disadvantage of network-based wireless location is its relatively lower accuracy, when compared to GPS-based location methods.

Network-based wireless location techniques have the significant advantage that the MS is not involved in the location-finding process, thus these systems do not require any modifications to existing handsets. Moreover, they do not require the use of GPS components, thus avoiding any political issue that may arise due to their use. And, unlike GPS location systems, many aspects of network-based location are not fully studied yet. This is due to the relatively recent introduction of this technology.

It is clear, however, that multipath propagation is one of the main sources of mobile-positioning errors, especially in fast channel fading situations. In infrastructure-based wireless-location systems, the accurate estimation of the time and amplitude of arrival of the first arriving ray at the receiver(s) is vital. Such estimates are used to obtain an estimate of the distance between the transmitter and bx;1receiver(s) in a wireless system. However, wireless propagation usually suffers from severe multipath conditions. In many of these cases, the prompt ray is succeeded by a multipath component that arrives at the receiver(s) within a short delay from the prompt ray. If this delay is smaller than the duration of the pulse-shape used in the wireless system (e.g., the chip duration, $T_c$, in CDMA systems), these two rays will overlap and thereby cause significant errors in the prompt ray time and amplitude of arrival estimation. Resolving these overlapping multipath components using known technology becomes impossible in low signal-noise-ratio and fast channel fading situations, which are common in wireless systems. This is why such rays are commonly referred to as "non-resolvable multipath components".

FIG. 1 and FIG. 2 show the combined impulse of a two ray channel and a conventional pulse-shape, for a CDMA IS-95 system, in two cases. In FIG. 1, the delay between the two channel rays is equal to twice the chip duration ($2T_c$). It is clear that the peaks of both rays are resolvable, thus allowing relatively accurate estimation of the prompt ray time and amplitude of arrival. However, in FIG. 2, both multipath components overlap and are nonresolvable by means of a peak-picking procedure. This can lead to significant errors in the prompt ray time and amplitude of arrival estimation.

Accordingly, several attempts to resolve multipath components have been made as follows:

Channel Searchers:

A general block diagram of a single path searcher 10 is shown in FIG. 3. These searchers usually apply a bank 12 of matched filtering stages $s(n-\tau)$ 14, each at a different time delay $\tau$, to the received signal r(n) 16. An example of these stages is the despreading-integration operation, for code division multiple access (CDMA) systems. The outputs of the matched filtering stages $m(n-\tau)$ 18 are then non-coherently averaged in a non-coherent integration stage 20 to avoid any possible attenuation in the amplitude of the output signal due to changes in the channel phase, carrier offsets or data ambiguity. The output 22 of the non-coherent integration stage 20 is usually called a power-delay profile (PDP). The searcher then picks the first peak in the PDP using a peak-picking stage 24 and assigns its time offset to the prompt ray time of arrival 26 and uses its value to estimate the prompt ray amplitude of arrival 28.

Such searchers are capable of resolving non-overlapping multipath components. In situations where the prompt ray overlaps with a successive ray, a huge error in both the time and amplitude of arrival is encountered. Such errors significantly increase when the time delay between the prompt and successive rays is decreased with respect to the period of the used pulse-shape. These errors in the time and amplitude of arrival are unacceptable in wireless-location finding applications.

Multipath Resolving Using Least Squares Techniques:

These techniques exploit the known transmission pulse-shape to resolve overlapping rays. A general block diagram for a searcher 50 of this type is shown in FIG. 4, where a bank 52 of matched filtering stages $s(n-\tau)$ 54 is applied to the received signal r(n) 56, each at a different time delay $\tau$. A least squares (LS) operation 58 is then applied to the outputs of the matched filtering stages $m(n-\tau)$ 60, using, for example, a matrix inversion technique. Other variants of this technique include for example the well-known ESPRIT and MUSIC algorithms that are known as super-resolution techniques. The output 62 of the LS operation is then non-coherently averaged in a non-coherent integration stage 64. Next, the output 66 of the non-coherent integration stage 64 undergoes prompt ray selection at block 68, and the time of arrival 70 and amplitude of arrival 72 of the prompt ray are estimated.

The LS techniques mainly suffer from noise boosting, which is caused by the ill-conditioning of the matrices involved in the LS operation, especially in fading conditions that prohibit long averaging intervals. This ill conditioning magnifies the noise at the output of the LS stage. For wireless-location finding applications, where the received signal to noise ratio (SNR) is relatively low, noise magnification leads to huge errors in the time and amplitude of arrival estimates, which results in a very low location precision.

In addition, applying least-squares methods can produce unnecessary errors in the case of single-path propagation. Note that in the case of single-path propagation, a high level of TOA/AOA estimation accuracy can be achieved by a single-path location searcher. However, if a least-squares stage is then used, this accuracy can be significantly degraded.

Other modified LS techniques that try to avoid matrix ill-conditioning, such as regularized least squares, total least squares and singular value decomposition methods, lack the required fidelity to resolve overlapping multipath components. Lack of the capability to resolve overlapping multipath, in low signal to noise ratio environments components, is the main location precision limiting factor.

Therefore, there is a need for a robust method to resolve these overlapping multipath components provides wireless-location finding equipment with high precision. The present invention satisfies that need, was well as others, and overcomes deficiencies in current techniques.

BRIEF SUMMARY OF THE INVENTION

The present invention generally comprises a method and apparatus for detecting overlapping fading multipath components for mobile-positioning systems that is based on exploiting the fact that overlapping multipath components fade independently. By way of example, and not of limitation, the method constructs and compares two cost functions. These two cost functions coincide for single-path propagation, while a difference is detected under multipath conditions. Repeating this procedure iteratively leads to an estimate of the number of overlapping multipath components. Thus, although fast channel fading is usually considered a challenge to the location finding process, we use it to our benefit in this case as an additional tool to detect and resolve overlapping multipath rays.

In an alternative embodiment, the least-squares operation needed for resolving overlapping multipath components is replaced with a gradient-based adaptive filtering operation. A projection technique is also provided that exploits all possible a-priori channel information into the adaptive filtering algorithm, thus providing needed robustness to divergence of the adaptive algorithm that might result from possible severe data matrix ill-conditioning and high noise levels, which are common in wireless location applications.

Having a-priori information about the existence and number of multipath components can be very useful in overcoming many of the challenges facing overlapping multipath resolving. Exploiting such information in the estimation process could be very valuable in the following respects:

(a) If no overlapping multipath components are detected within a pulse-shape period from the prompt ray, a peak-picking operation is adequate and no least-squares operation is needed. This avoids noise enhancement and saves unnecessary calculations. In these cases, a single path searcher, is adequate to achieve high accuracy for the time and amplitude of arrival estimates of the first arriving ray.

(b) Exploiting a-priori knowledge of the number of overlapping multipath components can be very useful in avoiding matrix ill-conditioning and thus noise enhancement due to least-squares operations. Using such information enhances the accuracy of multipath resolving to a great extent. If overlapping multipath components are detected, an adaptive searcher, which avoids the matrix ill-conditioning problem associated with the least-squares design, can be developed.

(c) Having information about the existence of overlapping multipath components could serve to provide a measure for the degree of confidence in the location estimation in general. Providing such level of confidence in the location process is strongly recommended by the FCC in addition to providing the MS location. For example, if no overlapping multipath components were detected in the vicinity of the first arriving ray of the MS signal at a specific BS, the level of accuracy in the estimation of the time and amplitude of arrival of the first arriving ray in this case is a function of the received signal SNR at this specific BS. Such accuracy level is high in the case of single path propagation. On the other hand, if overlapping multipath components were detected, the level of accuracy in this case is dependent on the received signal SNR as well as on the ability to resolve the overlapping multipath components. In general, higher accuracy can be expected in the case of no detected overlapping multipath components.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a graph showing the combined impulse response of a two ray channel and a conventional pulse-shape for a CDMA IS-95 system where the delay between the two channel rays is equal to twice the chip duration ($2T_c$) and the peaks of both rays are resolvable using a peak-picking procedure.

FIG. 2 is a graph showing the combined impulse response of a two ray channel and a conventional pulse-shape for a CDMA IS-95 system where both channel rays overlap and their peaks are not resolvable using a peak-picking procedure.

FIG. 17 shows the two rays. FIG. 18 shows the output of a conventional matched filtering stage followed by a conventional least-squares convolution stage. FIG. 19 shows the estimated channel if a regularized least-squares operation is used instead of the conventional least-squares operation. FIG. 20 shows the estimated channel when a constrained least-squares operation according to the present invention is employed.

FIG. 30 shows the amplitude response of the two-ray fading multipath channel. FIG. 31 shows the output of a conventional matched filtering state followed by a conventional least-squares deconvolution stage. FIG. 32 shows the output of a conventional matched filtering stage followed by a regularized least-squares deconvolution stage. FIG. 33 shows the output of the adaptive method and apparatus for channel estimation according to the present invention.

FIG. 40 is a graph showing the estimation time delay absolute mean square error versus time of the prompt ray for Channel D shown in FIG. 29.

FIG. 41 is a graph showing the amplitude relative mean square error versus time of the prompt ray for Channel D showing in FIG. 29.

DETAILED DESCRIPTION OF THE INVENTION

Figure 3:
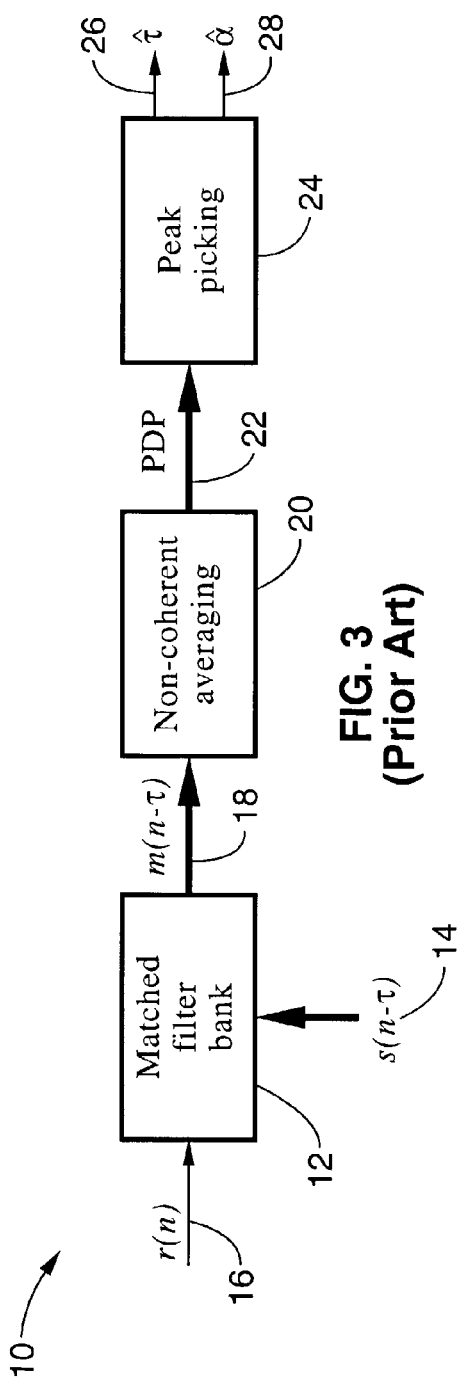
FIG. 3 is a functional block diagram of a conventional single path channel searcher.
Figure 4:
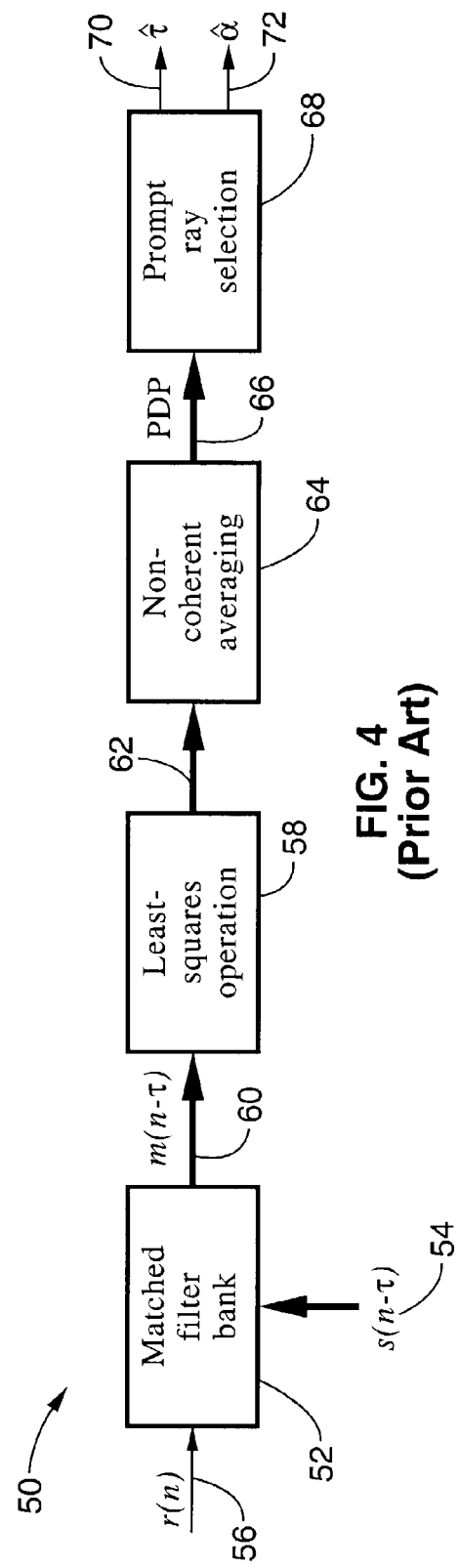
FIG. 4 is a functional block diagram of a conventional multipath least-squares channel searcher.

Referring more specifically to the drawings, for illustrative purposes the present invention is embodied in the method and apparatus described herein. It will be appreciated that the apparatus may vary as to configuration and as to details of the elements, and that the method may vary as to the specific steps and sequence, without departing from the basic concepts as disclosed herein.

Overlapping Multipath Detection

Problem Formulation

Consider a received sequence $\{r(n)\}$ that arises from a model of the form $$r(n) = c(n) * p(n) * h(n) + v(n), \quad (1)$$

where $\{c(n)\}$ is a known binary sequence, $\{p(n)\}$ is a known pulse-shape waveform sequence, $v(n)$ is zero-mean additive white Gaussian noise of variance $\sigma_v^2$, and $h(n)$ denotes the impulse response of a multipath channel with taps $$h(n) = \sum_{l=1}^{L} \alpha_l x_l(n) \delta(n - \tau_l^o), \quad (2)$$

where $\alpha_l$, $\{x_l(n)\}$, and $\tau_l^o$ are respectively the unknown gain, the normalized amplitude sequence, and the time of arrival of the $l^{th}$ multipath component (ray). Without loss of generality, we will assume that $$\tau_1^o < \tau_2^o < \ldots < \tau_L^o.$$

A common structure for CDMA channel estimation is to correlate the received signal, $r(n)$, with the delayed replica of known pulse-shaped code sequence, $s(n-\tau) = c(n-\tau) * p(n)$, over a dense grid of possible values of the delay, $\tau$. This correlation is done over a period of N samples of the received sequence, to obtain the following function of the delay, $\tau$, $$\frac{1}{N} \sum_{n=1}^{N} r(n) s(n - \tau).$$

If the channel has only one ray, it is well known that this function attains a maximum at a specific value of the delay, $\tau_p$, which is equal to the time of arrival of this single ray. Moreover, if the channel has more than one ray, the output of the correlation can have more than one peak. These peaks can also overlap.

For the case of fading channels, the correlation operation, described above, cannot be extended for the whole length of the received sequence, $r(n)$, as this would cause the correlation output to degrade due to the random variations of the fading channel phase. In this case, the correlation is obtained over a period of N samples of the received sequence, during which the fading channel does not vary much. The phase of the correlation over these N samples is removed by squaring and the squared value is stored. The same procedure is repeated over the next N samples of the received sequence and the resulting value is averaged with the stored value and so on; to obtain the following cost function $$J(\tau) = \frac{1}{M}\sum_{m=1}^{M}\left|\frac{1}{N}\sum_{n=n_o}^{mN}r(n)s(n-\tau)\right|^2, \quad (3)$$

where $s(n-\tau)=c(n-\tau)*p(n)$, $n_o=(m-1)N+1$, and the length of the received sequence, $\{r(n)\}$, is equal to NM. This procedure is known as coherent/noncoherent averaging.

The time of arrival of the first arriving ray, $\tau_1^o$, is obtained by estimating the index of the earliest peak of the cost function, $J(\tau)$. This approach is successful in estimating the time of arrival of the prompt ray only if the difference between the prompt ray delay, $\tau_1^o$, and the delay of the succeeding ray, $\tau_2^o$, is larger than the pulse-shape waveform main lobe duration, $T_p$. If this condition is not satisfied, picking the first peak of $J(\tau)$ could lead to significant errors in estimating the prompt ray time and amplitude of arrival as indicated in FIG. 1 and FIG. 2.

Multipath components overlapping with the prompt ray can be resolved using least-squares methods that exploit the known pulse-shape waveform. Such techniques involve a matrix inversion operation of the form $$\hbar = (A^*A)^{-1}A^*r, \quad (4)$$

where A is the pulse-shaping waveform convolution matrix and r is a despread received sequence sample vector. The accuracy of such techniques strongly depends on the available a-priori information about the channel multipath components, including the number of existing multipath components in the vicinity of the prompt ray. Such information is very valuable in avoiding matrix ill-conditioning of the convolution matrix A by defining the region of support of the channel multipath components. Furthermore, if no multipath components are detected in the vicinity of the prompt ray, the whole least-square operation could be avoided, thus eliminating any matrix ill-conditioning errors and saving unnecessary computations. The main contribution of this paper is to provide a technique for detecting the existence of fading multipath components overlapping with the prompt ray, along with an estimate of the number of overlapping rays.

Solution

A preferred embodiment of the inventive method for multipath detection in wireless environments will now be described. Here, we use the term "detection" to refer to determining if the number of multipath components within the vicinity of the first arriving peak is equal to or more than one. For example, if more than one ray exists, then overlapping multipath components are detected. The method exploits the fact that different multipath rays fade independently, i.e., it exploits the following property:

$$E[x_i(n)x_j^*(n)] = 1, i = j, \quad (5)$$
$$= 0, i \neq j.$$

To understand the inventive approach, consider the case of a noiseless single path channel that consists of a single delay $\tau_p$. Notice that, in this case, due to the symmetry of the pulse-shaping waveform, the cost function, $J(\tau)$, given in Equation (3), has the following symmetry property:

$$J(\tau_p + \delta\tau) = J(\tau_p - \delta\tau) \quad (6)$$

$$= \frac{1}{M}\sum_{m=1}^{M}\left|\frac{1}{N}\sum_{n=n_o}^{mN}r(n)s(n-\tau_p-\delta\tau)\right|^2$$

$$= \frac{1}{M}\sum_{m=1}^{M}\left|\frac{1}{N}\sum_{n=n_o}^{mN}r(n)s(n-\tau_p+\delta\tau)\right|^2$$

$$= \frac{1}{M}\sum_{m=1}^{M}\left(\left[\frac{1}{N}\sum_{n=n_o}^{mN}r(n)s(n-\tau_p+\delta\tau)\right]\cdot \left[\frac{1}{N}\sum_{n=n_o}^{mN}r(n)s(n-\tau_p-\delta\tau)\right]^*\right),$$

where "★" denotes complex conjugation. In other words, we can see that due to the symmetry of the pulse-shape waveform, p(n), the cost function, $J(\tau)$, is also symmetrical around the delay $\tau_p$. Thus, the value of $J(\tau_p+\delta\tau)$ can be obtained by any of three different operations: by averaging the squared partial correlations of N samples of the received sequence, r(n), with $s(n-\tau_p,\delta\tau)$, by averaging similar squared partial correlations with $s(n-\tau_p+\delta\tau)$, or by averaging the product of the partial correlations with $s(n-\tau_p-\delta\tau)$ and the complex conjugate of similar partial correlations with $s(n-\tau_p+\delta\tau)$. Let $J_{product}$ denote the value obtained using the third operation. Thus, in the case of noiseless single path propagation, we have $$J(\tau_p+\delta\tau)=J(\tau_p-\delta\tau)=J_{product}.$$

In the case of overlapping fading multipath propagation, the previous equality does not hold as the three functions, $J(\tau_p+\delta\tau)$, $J(\tau_p-\delta\tau)$, and $J_{product}$, will contain cross terms of different multipath components, as well as other squared terms of the same rays. Since, different rays fade independently, we expect the averaged cross terms to vanish leaving only same ray squared terms. Thus, we would expect a difference to exist between $J_{product}$ and each of $j(\tau_p+\delta\tau)$ and $J(\tau_p-\delta\tau)$, in the multipath propagation case. We will base our proposed algorithm on detecting this difference and using it as an index of the existence of overlapping fading rays. Moreover, we will use a special form of this difference; namely $J(\tau_p+\delta\tau)+J(\tau_p-\delta\tau)-2J_{product}$. We will show that this difference will generally be positive for overlapping multipath propagation.

With the foregoing in mind, the detection method of the present invention will now be described in detail. First, however, the steps of this method can be summarized as follows:

1. A power delay profile (PDP), $J(\tau)$, of the received sequence, $\{r(n)\}$, is computed as given by Equation (3).

2. Resolvable rays are separated from the prompt ray by keeping values of $J(\tau)$ within a window of twice the chip duration ($2T_c$) around the first arriving peak and discarding values of $J(\tau)$ outside this window range. That is we consider only the range of delays given by $$\tau_p-T_c<\tau<\tau_p+T_c, \quad (7)$$

where $\tau_p$ is the index of the first arriving peak, which is given by $$\tau_p + \max_\tau J(\tau). \quad (8)$$

Here we note that rays separated by more than $T_c$ are resolvable by peak-picking techniques since the width of the main lobe of a CDMA pulse-shaping waveform is conventionally chosen to be equal to the chip duration ($T_c$). Note also that the number of delays inside the search window defined by Equation (7) is equal to $2T_c/T_s+1$, where $T_s$ denotes the sampling period of the received sequence, $\{r(n)\}$. Note that $T_s < T_c$.

3. Two cost functions, $C_s$ and $C_m$, are then computed and compared. These two cost functions are designed such that their values are different if multiple rays exist within the vicinity of the first arriving peak. On the other hand, the two cost functions coincide for single path propagation implying that the time of arrival of the prompt ray is equal to $\tau_p$. In order to define $C_s$ and $C_m$, we first calculate the two functions $J_s(\delta\tau)$ and $J_m(\delta\tau)$:

$$J_s(\delta\tau) \triangleq \frac{1}{M}\sum_{m=1}^{M}\left|\frac{1}{N}\sum_{n=n_o}^{mN}r(n)s(n-\tau_p+\delta\tau)\right|^2 + \quad (9)$$

$$\frac{1}{M}\sum_{m=1}^{M}\left|\frac{1}{N}\sum_{n=n_o}^{mN}r(n)s(n-\tau_p+\delta\tau)\right|^2$$

$$= J(\tau_p+\delta\tau) + J(\tau_p-\delta\tau),$$

and $$J_m(\delta\tau) = \frac{2}{M}\sum_{m=1}^{M}\left(\left[\frac{1}{N}\sum_{n=n_o}^{mN}r(n)s(n-\tau_p+\delta\tau)\right]\cdot \quad (10)\right.$$

$$\left.\left[\frac{1}{N}\sum_{n=n_o}^{mN}r(n)s(n-\tau_p-\delta\tau)\right]^*\right)$$

$$= 2J_{product}.$$

The two cost functions, $C_s$ and $C_m$ are then calculated from $$C_s \triangleq \frac{T_s}{T_c}\sum_{\delta\tau=T_s}^{T_c}J_s(\delta\tau) - \frac{2\hat{\sigma}_v^2}{N}, \quad (11)$$

$$C_m \triangleq \frac{T_s}{T_c}\sum_{\delta\tau=T_s}^{T_c}J_m(\delta\tau), \quad (12)$$

where $$\delta\tau = T_s, 2T_s, \ldots, T_c$$

and the quantity $$\hat{\sigma}_v^2$$

is an estimate of the noise variance $$\sigma_v^2,$$

which can be estimated using many conventional techniques. For example, in the case of reverse link CDMA channels, the noise variance $$\sigma_v^2$$

can be estimated directly from the received sequence $\{r(n)\}$ as $$\hat{\sigma}_v^2 = \frac{1}{K_n}\sum_{i=1}^{K_n}|r(i)|^2,$$

for some value $K_n \leq NM$.

The inventive concept behind the previous definitions of $C_s$ and $C_m$ is discussed in more detail below. However, at this point, we will introduce some of the reasoning behind these definitions. As the previous equations show, $C_s$ and $C_m$ are averaged values of the two functions $J_s(\delta\tau)$ and $J_m(\delta\tau)$, for all possible values of $\delta\tau$ (the need for subtracting the noise variance term will also be explained in more detail below). Thus, we would expect the difference between $C_s$ and $C_m$ to represent and average of the difference $J_s(\delta\tau)-J_m(\delta\tau)$ over all values $\delta\tau$. As we discussed previously, this average difference resembles an average of the difference $$J(\tau_p+\delta\tau)+J(\tau_p-\delta\tau)-2J_{product}$$

over all values $\delta\tau$, which we would expect to be an index to provide an indication of the existence of overlapping multipath components. Note also that with an accurate estimate of the noise variance, $C_s$ and $C_m$ are equal for single path propagation. Furthermore, $C_s$ is larger than $C_m$ for multipath propagation. Thus, we will base our decision criterion on comparing the difference between both functions with a threshold value, $\beta$: if $C_s-C_m<\beta$, we declare that only one ray exists in the vicinity of the first arriving peak. However, if $C_s-C_m>\beta$, we declare that multipath propagation exists.

Figure 5:
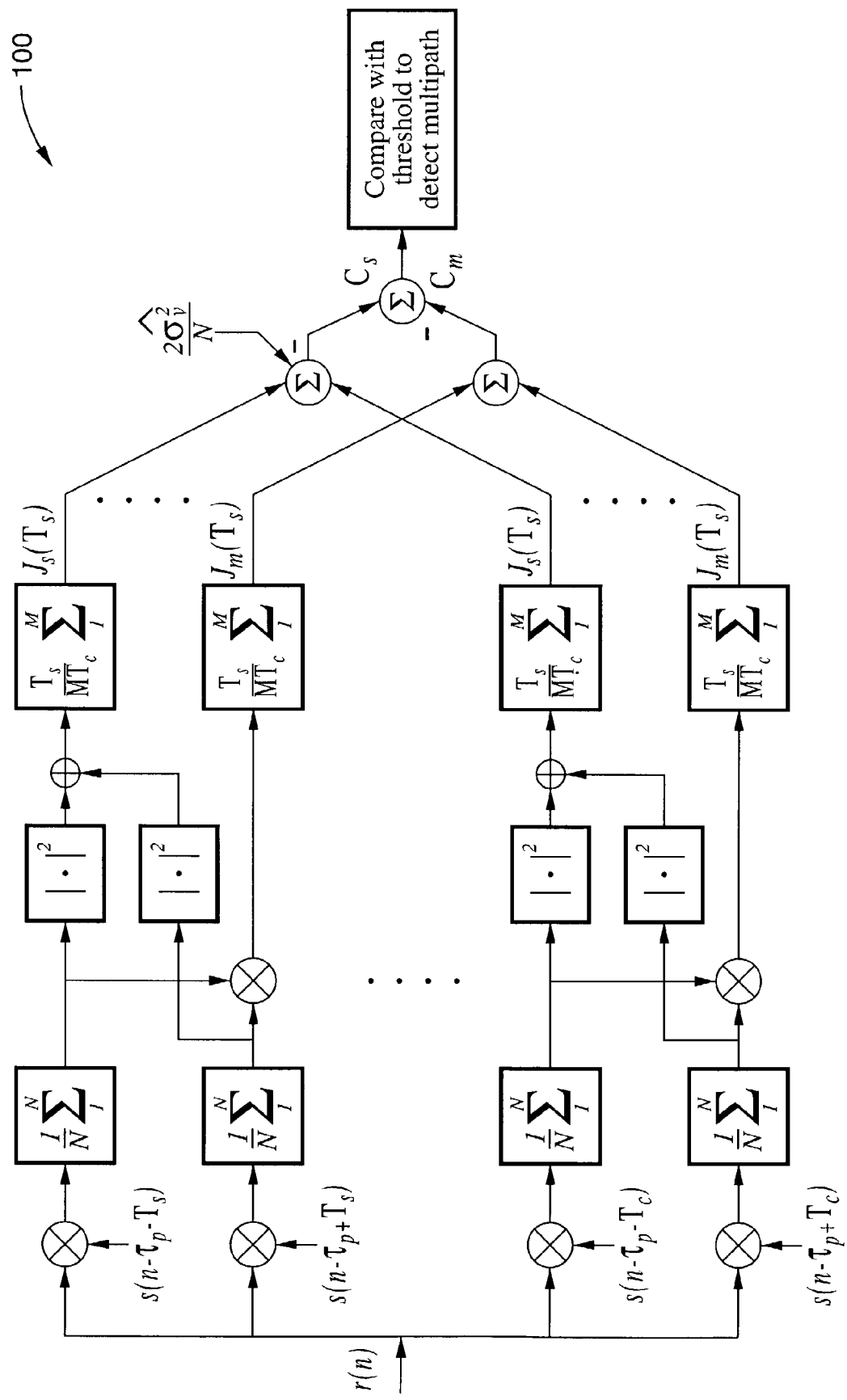
FIG. 5 is a functional block diagram depicting an embodiment of a method and apparatus for detecting multipath components according to the present invention.

FIG. 5 shows an implementation of the invention where $K=T_c/T_s$ and $q=\tau_p$. If only one ray is detected, no least-squares operations are needed and the prompt ray time of arrival is set to $\tau_p$. On the other hand, if multiple rays are detected, a constrained least-squares operation is performed with the number of rays set to two. The index $\tau_p$ is then set to the time of arrival of the first arriving ray estimated from the least-squares operation and the steps are repeated to detect more than two overlapping rays.

Figure 6:
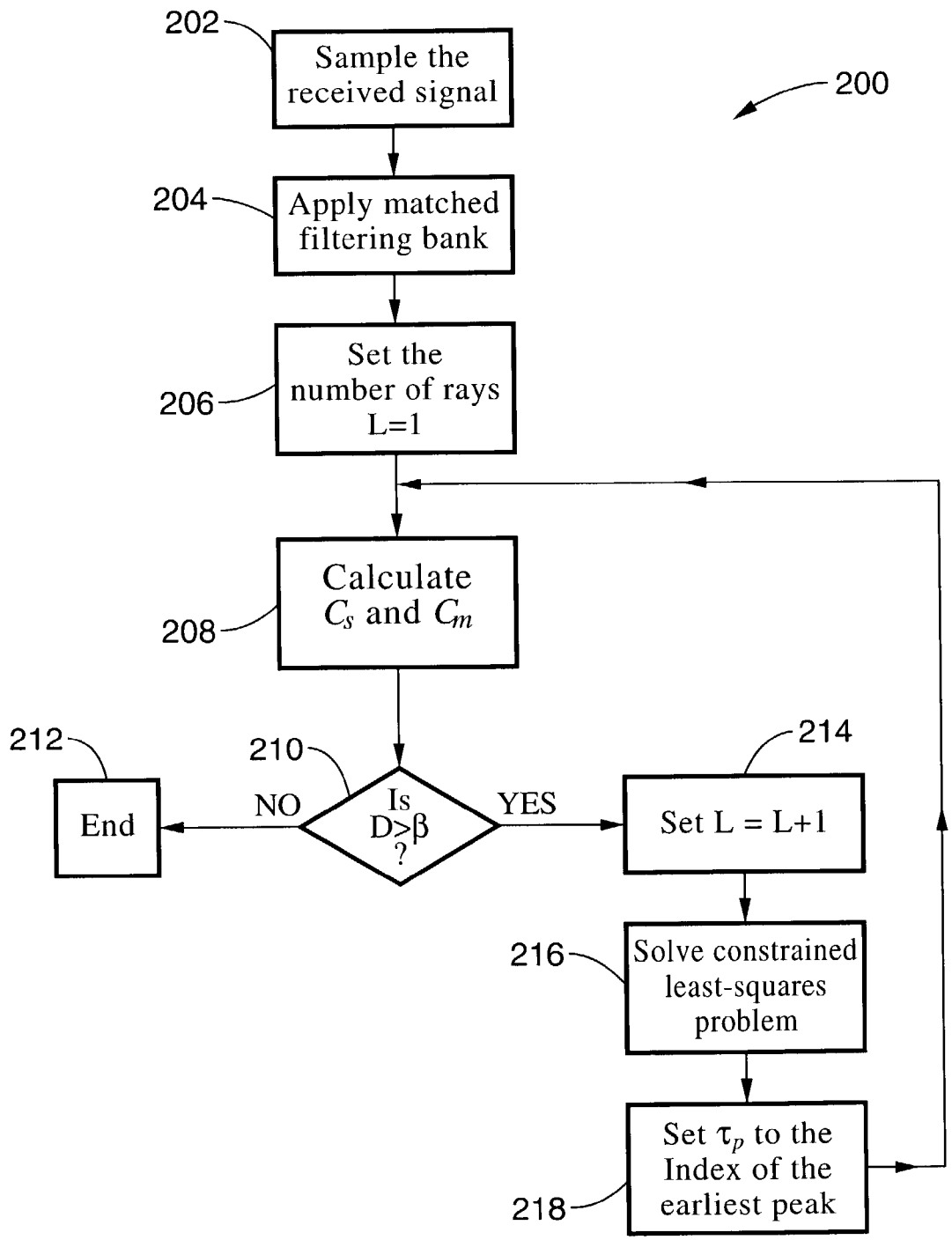
FIG. 6 is a flow chart of a embodiment of a method for estimating the number of overlapping multipath components according to the present invention.

Referring more particularly to FIG. 6, an embodiment 200 of the steps for multipath detection in wireless environments is shown. The method primarily exploits the fact that different multipath rays fade independently. In accordance with the method, at block 202 the received signal is sampled. Next, at block 204, the matched filtering bank is applied to the sampled signal. At block 206 a counter representing the number (L) of rays is set to the value of one. Then, at block 208, the cost functions are calculated. Once the cost functions are constructed, the difference between the two cost functions (D) is compared to a threshold (Th) at block 210. If the difference is less than the threshold, the detection operation is terminated at block 212 since multipath rays do not exist. In this case, the maximum of the PDP should only be considered for time and amplitude of arrival estimation. On the other hand, if the difference is higher than the threshold, then multipath components exist and the number of multipaths (L) is incremented at block 214. The multipath delays are then estimated by solving the constrained least-squares problem at block 216. Next, $\tau_p$ is set to the index of the earliest peak at block 218 and the detection method is recursively repeated around the delay of the earliest detected ray.

As shown in the flow diagram of FIG. 6, this procedure is repeated until no further rays are detected. For simplicity, we will consider only the case of only two overlapping rays in the vicinity of the first arriving peak. However, those skilled in the will appreciate that the case of L>2 is approached in the same manner.

Analysis

We will now analyze the method described above. First, we prove that for overlapping multipath propagation $C_s$ is always larger than $C_m$, and that they coincide for single path propagation. Second, we arrive at expressions to select the algorithm parameters N and β.

Consider the case of two overlapping multipath components, i.e., $$h(n) = \alpha_1 x_1(n)\delta(n-\tau_p+\tau_1) + \alpha_2 x_2(n)\delta(n-\tau_p-\delta_2).$$

Here we defined, for convenience, the delays of the two rays by $$\tau_1^o \triangleq \tau_p - \tau_1,$$
$$\tau_2^o \triangleq \tau_p + \tau_2. \quad (13)$$

Substituting into Equation (1) and using $s(n) \triangleq c(n)*p(n)$, the received sequence r(n) can be written as $$r(n) = \alpha_1 x_1(n)s(n-\tau_p+\tau_1) + \alpha_2 x_2(n)s(n-\tau_p-\tau_2) + v(n). \quad (14)$$

The case of single-path propagation corresponds to $\tau_1 = \tau_2 = 0$ and $x_1(n) = x_2(n)$, which leads to a single ray of delay $\tau_p$ and amplitude $\alpha = \alpha_1 + \alpha_2$. We will consider the case of an infinite received sequence length (M→∞). This is a reasonable assumption for wireless location applications, where the estimation period is in the order of a fraction of a second.

Thus, $J_s(\delta\tau)$ and $J_m(\delta\tau)$, in Equations (9) and (10), become, by the law of large numbers, $$J_s(\delta\tau) = E\left|\frac{1}{N}\sum_{n=n_o}^{mN} r(n)s(n-\tau_p+\delta\tau)\right|^2 + E\left|\frac{1}{N}\sum_{n=1}^{N} r(n)s(n-\tau_p-\delta\tau)\right|^2,$$

and $$J_m(\delta\tau) = 2E\left(\left[\frac{1}{N}\sum_{n=n_o}^{mN} r(n)s(n-\tau_p+\delta\tau)\right] \cdot \left[\frac{1}{N}\sum_{n=n_o}^{mN} r(n)s(n-\tau_p-\delta\tau)\right]^*\right),$$

in terms of the expectation operator E. Using Equation (14), we obtain $$J_s(\delta\tau) = E\left|\frac{1}{N}\sum_{n=1}^{N}(\alpha_1 x_1(n)s(n-\tau_1^o) + \alpha_2 x_2(n)s(n-\tau_2^o) + v(n))s(n-\tau_p+\delta\tau)\right|^2 + E\left|\frac{1}{N}\sum_{n=1}^{N}(\alpha_1 x_1(n)s(n-\tau_1^o) + \alpha_2 x_2(n)s(n-\tau_2^o) + v(n))s(n-\tau_p-\delta\tau)\right|^2$$

and $$J_m(\delta\tau) = 2E\left(\left[\frac{1}{N}\sum_{n=1}^{N}(\alpha_1 x_1(n)s(n-\tau_1^o) + \alpha_2 x_2(n)s(n-\tau_2^o) + v(n))s(n-\tau_p+\delta\tau)\right] \cdot \left[\frac{1}{N}\sum_{n=1}^{N}(\alpha_1 x_1(n)s(n-\tau_1^o) + \alpha_2 x_2(n)s(n-\tau_2^o) + v(n))s(n-\tau_p-\delta\tau)\right]^*\right)$$

To further proceed we make use of the following result

Lemma: It holds that $$\frac{1}{N}\sum_{n=1}^{N} \alpha_j x_j(n)s(n-\tau_j)s(n-\tau) = \alpha_j R_p(\tau-\tau_j)\frac{1}{N}\sum_{n=1}^{N} x_j(n), \quad (15)$$

where $R_p(n)$ is the autocorrelation function of the pulse-shaping waveform, defined by $$R_p(n) = p(n)*p(n).$$

Proof: We assume that the variations in the channel gain sequence $\{x_1(n)\}$ within the duration of the pulse-shaping waveform are negligible. This assumption is feasible for wireless systems even for fast channels. Then we write $$B \triangleq \frac{1}{N}\sum_{n=1}^{N} \alpha_j x_j(n)s(n-\tau_j)s(n-\tau)$$

$$= \frac{1}{N}\sum_{n=1}^{N}[\alpha_j(x_j(n)c(n))*p(n-\tau_j)] \cdot [c(n)*p(n-\tau)].$$

For N large enough, we can write this autocorrelation in convolution form as $$B = \frac{1}{N}\alpha_j x_j(-n)c(-n)*p(-n-\tau_j)*c(n)*p(n-\tau).$$

Using the properties of the convolution operation, we get $$B = \frac{1}{N}\alpha_j R_p(\tau-\tau_j)x_j(-n)c(-n)*c(n).$$

Rewriting this term as a correlation sum, we get $$B = \frac{1}{N}\sum_{n=1}^{N}\alpha_j R_p(\tau-\tau_j)x_j(n)c(n)\cdot c(n),$$

which leads to Equation (15) since $c(n)\cdot c(n)=1$.

Using Equation (15), the function $J_s(\delta\tau)$ becomes $$J_s(\delta_\tau) = E\left|\frac{1}{N}\sum_{n=1}^{N}(\alpha_1 R_p(\delta\tau+\tau_1)x_1(n)+\alpha_2 R_p(\delta\tau-\tau_2)x_2(n)+v_1(n))\right|^2 +$$

$$E\left|\frac{1}{N}\sum_{n=1}^{N}(\alpha_1 R_p(\delta\tau-\tau_1)x_1(n)+\alpha_2 R_p(\delta\tau+\tau_2)x_2(n)+v_2(n))\right|^2,$$

where $$v_1(n)\triangleq v(n)\cdot s(n-\tau_p+\delta\tau),$$

$$v_2(n)\triangleq v(n)\cdot s(n-\tau_p-\delta\tau), \qquad (16)$$

For mathematical tractability of the analysis, we impose the following assumption:

A.1 The sequence $\{s(n)\}$ is identically statistically independent (i.i.d.), and is independent of the channel fading gain sequence $\{x_i(n)\}$.

Expanding the sum in $J_s(\delta\tau)$ over n, squaring, applying the expectation operator, and using Equation (5) and A.1, $J_s(\delta\tau)$ is equal to $$J_s(\delta\tau) = \alpha_1^2 B_{f1}(R_p^2(\delta_r+\tau_1)+R_p^2(\delta\tau-\tau_1))+ \qquad (17)$$

$$\alpha_2^2 B_{f2}(R_p^2(\delta\tau+\tau_2)+R_p^2(\delta\tau-\tau_2))+\frac{2\sigma_v^2}{N},$$

where $$B_{fj} = \frac{R_{x_j}(0)}{N}+\sum_{i=1}^{N-1}\frac{2(N+i)R_{x_j(i)}}{N^2}, \text{ and}$$

$$R_{x_j}(i) = E[x_j(n)x_j^*(n-i)].$$

On the other hand, using the same procedure, the function $J_m(\delta\tau)$ can be expressed as $$J_m(\delta_\tau) = 2E\left(\left[\frac{1}{N}\sum_{n=1}^{N}(\alpha_1 R_p(\delta_\tau-\tau_1)x_1(n)+\alpha_2 R_p(\delta_r+\tau_2)x_2(n)+v_1(n))\right]\cdot\right.$$

$$\left.\left[\frac{1}{N}\sum_{n=1}^{N}(\alpha_1 R_p(\delta\tau+\tau_1)x_1(n)+\alpha_2 R_p(\delta\tau+\tau_2)x_2(n)+v_2(n))\right]^*\right)$$

$$= 2E\left(\alpha_1^2 R_p(\delta\tau-\tau_1)R_p(\delta\tau+\tau_1)\left|\frac{1}{N}\sum_{n=1}^{N}x_1(n)\right|^2 + \right.$$

$$\left.\alpha_2^2 R_p(\delta\tau-\tau_2)R_p(\delta\tau+\tau_2)\left|\frac{1}{N}\sum_{n=1}^{N}x_2(n)\right|^2\right)$$

$$= 2(\alpha_1^2 B_{f1}R_p(\delta\tau-\tau_1)R_p(\delta\tau+\tau_1)+\alpha_2^2 B_{f2}R_p(\delta\tau-\tau_2)R_p(\delta_\tau+\tau_2)).$$

The difference between the two functions, $J_s(\delta\tau)$ and $J_m(\delta\tau)$, is thus given by $$J_s(\delta\tau)-J_m(\delta\tau) = \alpha_1^2 B_{f1}(R_p^2(\delta\tau+\tau_1)+R_p^2(\delta\tau-\tau_1))+$$

$$\alpha_2^2 B_{f2}(R_p^2(\delta\tau+\tau_2)+R_p^2(\delta\tau-\tau_2))+\frac{2\sigma_v^2}{N}-$$

$$-2\alpha_1^2 B_{f1}R_p(\delta\tau-\tau_1)R_p(\delta\tau+\tau_1)+$$

$$2\alpha_2^2 B_{f2}R_p(\delta v-\tau_2)R_p(\delta\tau+\tau_2).$$

Rearranging terms, we get $$J_s(\delta\tau)-J_m(\delta\tau) = \alpha_1^2 B_{f1}(R_p(\delta\tau+\tau_1)-R_p(\delta\tau-\tau_1))^2 +$$

$$\alpha_2^2 B_{f2}(R_p(\delta\tau+\tau_2)-R_p(\delta\tau-\tau_2))^2+\frac{2\sigma_v^2}{N}.$$

Here we note that, for every $\delta\tau$, $$\left(J_s(\delta\tau)-\frac{2\sigma_v^2}{N}\right)-J_m(\delta\tau) = \alpha_1^2 B_{f1}(R_p(\delta\tau+\tau_1)-R_p(\delta\tau-\tau_1))^2 + \qquad (18)$$

$$\alpha_2^2 B_{f2}(R_p(\delta\tau+\tau_2)-R_p(\delta\tau-\tau_2))^2 \geq 0,$$

and that the equality to zero occurs only for $\tau_1=\tau_2=0$, which corresponds to the single path propagation case. This is a useful observation since it provides a tool that can be used to distinguish between single path and multipath propagation conditions.

Note that the value of the difference is given in Equation (18) varies with $\delta\tau$, the delay between the two rays ($\tau_1+\tau_2$), and the ratio between the amplitude of the two rays ($\alpha_1/\alpha_2$). Since the later two of these quantities are unknowns, we are not able to determine the proper delay, $\delta\tau$, at which this difference attains a maximum. However, we use a different approach, which is based on evaluating the average of this difference over all possible $\delta\tau$, i.e., for $$T_s \leq \delta\tau \leq T_c.$$

This average difference is given by $$\frac{T_s}{T_c}\sum_{\delta\tau=T_s}^{T_c}\left(J_s(\delta\tau) - \frac{2\sigma_v^2}{N} - J_m(\delta\tau)\right) = \alpha_1^2 B_{f1}\frac{T_s}{T_c}\sum_{\delta\tau=T_s}^{T_c}(R_p(\delta\tau+\tau_1) -$$

$$R_p(\delta\tau-\tau_1))^2 + \alpha_2^2 B_{f2}\frac{T_s}{T_c}\sum_{\delta\tau=T_s}^{T_c}$$

$$(R_p(\delta\tau+\tau_2) - R_p(\delta\tau-\tau_2))^2$$

Also note that since the noise variance $$\sigma_v^2$$

is not known, it needs to be estimated as explained before. If the estimate of $$\sigma_v^2$$

is denoted by $$\hat{\sigma}_v^2,$$

then an estimate of the difference can be obtained from $$D \triangleq C_c - C_m, \quad (19)$$

where $$C_s \triangleq \frac{T_s}{T_c}\sum_{\delta\tau=T_s}^{T_c} J_s(\delta\tau) - \frac{2\hat{\sigma}_v^2}{N}, \quad (20)$$

$$C_m \triangleq \frac{T_s}{T_c}\sum_{\delta\tau=T_s}^{T_c} J_m(\delta\tau). \quad (21)$$

Note further that $$D = \alpha_1^2 B_{f1}\frac{T_s}{T_c}\sum_{\delta\tau=T_s}^{T_c}(R_p(\delta\tau+\tau_1) - R_p(\delta\tau-\tau_1))^2 + \quad (22)$$

$$\alpha_2^2 B_{f2}\frac{T_s}{T_c}\sum_{\delta\tau=T_s}^{T_c}(R_p(\delta\tau+\tau_2) - R_p(\delta\tau-\tau_2))^2 + \frac{q}{N},$$

where q is the error in the noise variance estimate, $$q \triangleq \sigma_v^2 - \hat{\sigma}_v^2. \quad (23)$$

Assuming an unbiased estimator $$\hat{\sigma}_v^2,$$

the estimation error q will be a zero-mean random variable.

Parameter Selection

We now use the analysis of the previous section to select the values of the parameters N and β. The value of the difference (D) in Equation (22) comprises two terms. The first term is positive for multipath propagation and is equal to zero for single path propagation. We will denote the first term by $$C \triangleq \alpha_1^2 B_{f1}\frac{T_s}{T_c}\sum_{\delta\tau=T_s}^{T_c}(R_p(\delta\tau+\tau_1) - R_p(\delta\tau-\tau_1))^2 + \quad (24)$$

$$\alpha_2^2 B_{f2}\frac{T_s}{T_c}\sum_{\delta\tau=T_s}^{T_c}(R_p(\delta\tau+\tau_2) - R_p(\delta\tau-\tau_2))^2.$$

The second term is a zero-mean random variable whose variance is equal to $$\sigma_q^2/N^2.$$

Hence, D=C+noise. This case resembles the problem of estimating a binary signal in the presence of zero-mean additive random noise. In other words, making a decision whether the signal is positive or zero. Of course, the accuracy of the estimation process increases with the power of the signal ($C^2$). The detection accuracy also decreases with the noise variance, $$\sigma_q^2/N^2.$$

Thus, the accuracy of the detection process is improved by maximizing the signal to noise ratio, defined by $$S \triangleq \frac{C^2}{\sigma_q^2/N^2}. \quad (25)$$

The value of the parameter N is chosen as the value that maximizes S. In order to arrive at this value, we consider the case of equal maximum Doppler frequency for both rays (i.e., they have the same autocorrelation function, $R_x(i)$). In this case, the part of S that depends on N is given by $B_f^2 N^2$, where $$B_{fi} = B_f = \frac{R_x(0)}{N} + \sum_{i=1}^{N-1} \frac{2(N-i)R_x(i)}{N^2}.$$

Figure 7:
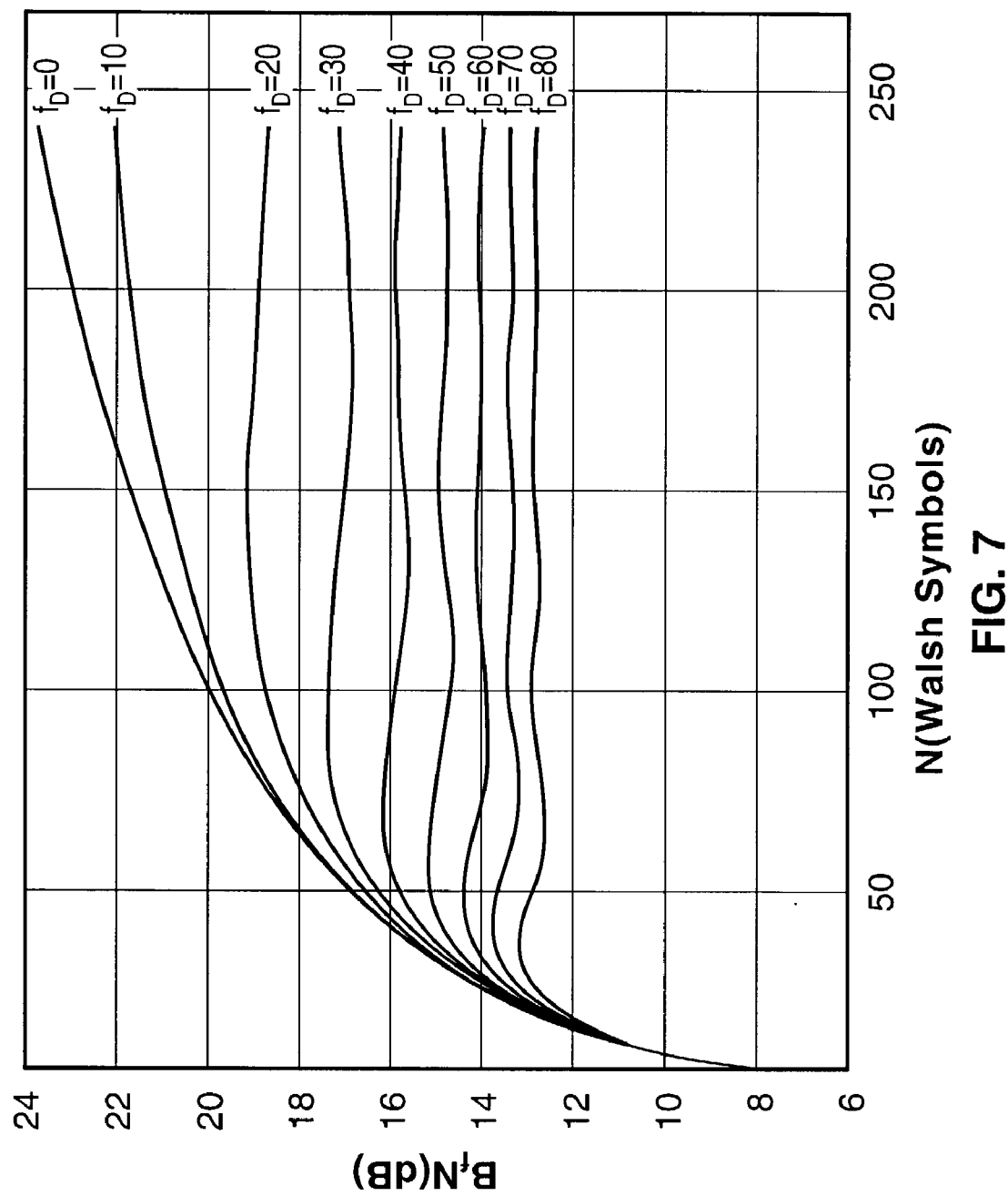
FIG. 7 is a graph showing a plot of $B_fN$ versus N for a Rayleigh fading channel and different values of the maximum Doppler frequency, $f_D$ where N is given in multiples of the number of samples in the Walsh symbol period in a typical IS-95 system, which is 64.

Our goal now is to maximize S with respect to N, which is equivalent to maximizing $B_f^2 N^2$. FIG. 7 shows a plot of $B_f N$ versus N for a Rayleigh fading channel and different values of the maximum Doppler frequency, $f_D$. In this figure, N is given in multiples of the number of samples in Walsh symbol period in a typical IS-95 system.

It can be seen that, for each $f_D$, there is a value of N, $N_{opt}$, that maximizes $B_f N$. Increasing N beyond this optimum value, $B_f N$ oscillates and then asymptotically approaches a fixed value that depends on $f_D$.

Since $B_f N$ is a positive function of N, thus maximizing $B_f^2 N^2$ is the equivalent to maximizing $B_f N$. The value of $N_{opt}$ is computed by solving the equation $$\frac{d(B_f N)}{dN} = \sum_{i=1}^{N_{opt}-1} \frac{2(N_{opt}-i)R_x(i) - 2N_{opt}R_x(i)}{N_{opt}^2} = 0, \quad (26)$$

or, equivalently, $$\sum_{i=1}^{N_{opt}-1} i R_x(i) = 0. \quad (27)$$

This shows that the parameter N should be adapted based on the available knowledge of the channel according to Equation (27). This is the same value of the optimal coherent integration period used in single path and multipath searchers. Note that for the case of Rayleigh fading channels, computing $N_{opt}$ requires only an estimate of the channel maximum Doppler frequency, which can be obtained using many well-known techniques.

We now calculate the optimal value of the threshold β. We again use the analogy with the case of estimating binary signals in additive random noise. In this case, the optimal value of the threshold $\beta_{opt}$, should be taken as half the amplitude of the binary signal. In our case, this corresponds to $$\beta_{opt} = \frac{C}{2} = \frac{1}{2}\left(\alpha_1^2 \beta_{f1} \frac{T_s}{T_c} \sum_{\delta\tau=T_s}^{T_c} (R_p(\delta\tau+\tau_1) - R_p(\delta\tau-\tau_1))^2 + \right.$$

$$\left. \alpha_2^2 \beta_{f2} \frac{T_s}{T_c} \sum_{\delta\tau=T_s}^{T_c} (R_p(\delta\tau+\tau_2) - R_p(\delta\tau-\tau_2))^2 \right) \quad (28)$$

Unfortunately, since the value of the parameters $\tau_1$, $\tau_2$, $\alpha_1$, and $\alpha_2$ are not known, we are not known, we are not able to calculate the value of $\beta_{opt}$ in practice. However, we will use a different approach in selecting the threshold, β.

Figure 8:
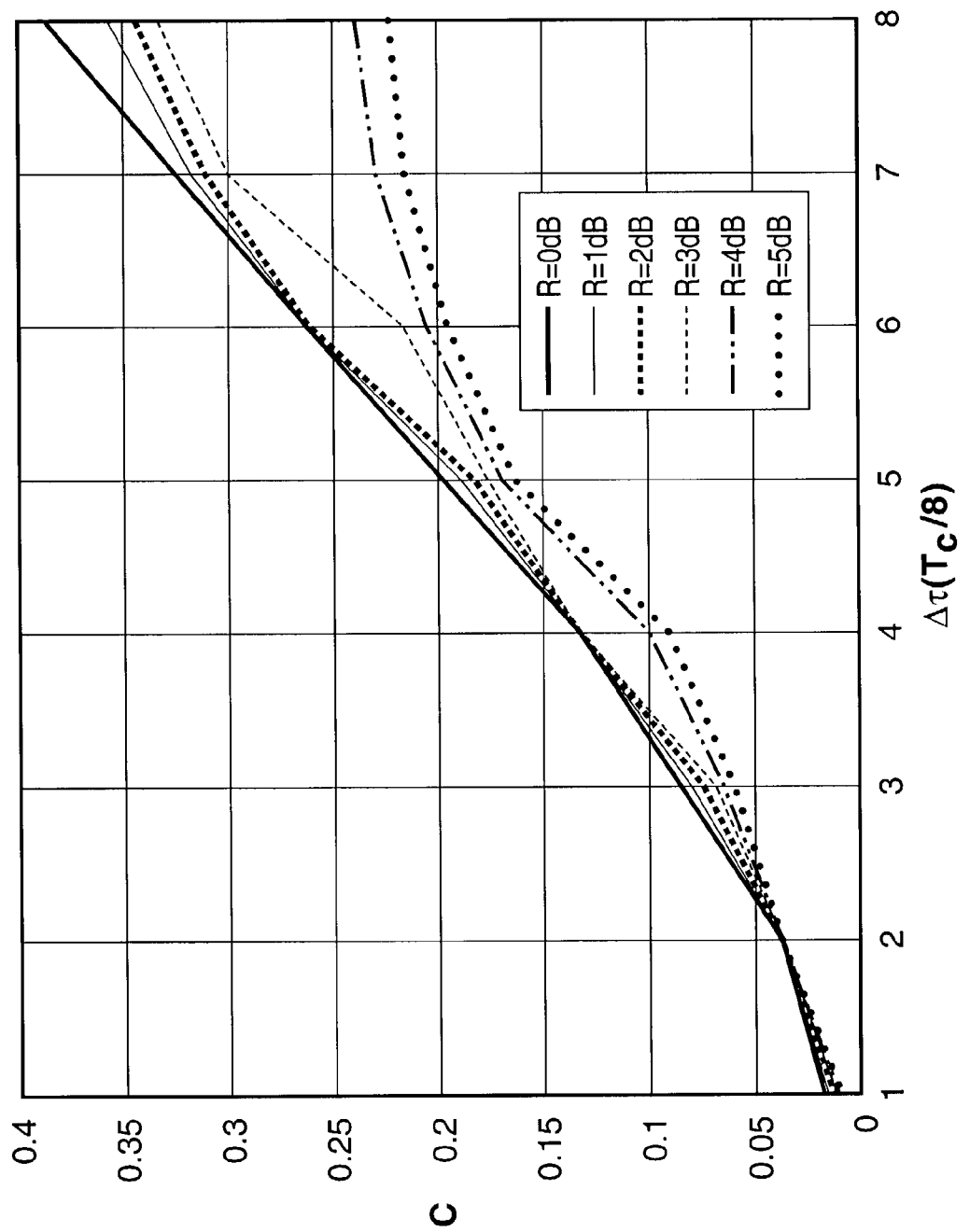
FIG. 8 a graph showing a plot of C versus $\Delta\tau$ for different values of R.

In order to arrive at a reasonable practical value for β, we first study the properties of $\beta_{opt}$. FIG. 8 shows C as a function of the delay between the two rays, $$\Delta\tau \triangleq \tau_2^o - \tau_1^o = \tau_1 + \tau_2,$$

for different values of the ratio between the power of the rays, which is defined by $$R \triangleq \frac{\alpha_1^2}{\alpha_2^2}.$$

In this figure, the maximum Doppler frequency ($f_D$) is equal to 80 Hz, N is set to the optimal value calculated from Equation (27), and M=128. The figure shows that C increases with τ, for $T_c/8 \leq \Delta\tau \leq T_c$. This indicates that detecting sub-chip multipath components becomes easier when the delay between the two multipath components increases.

Figure 9:
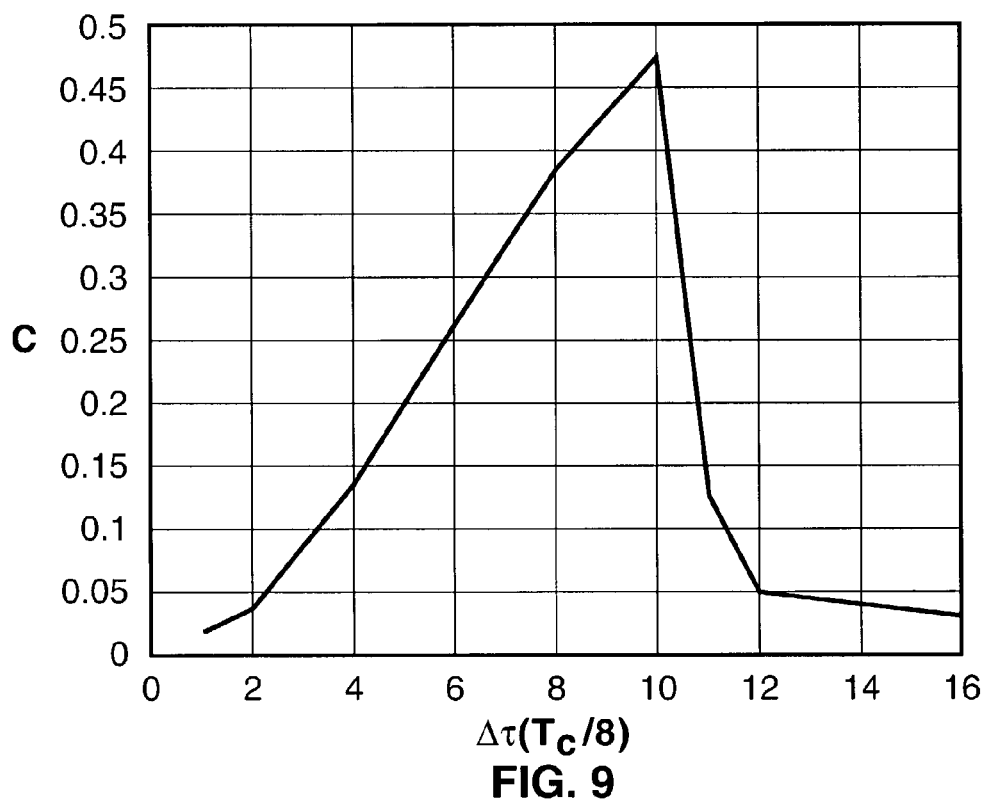
FIG. 9 is a graph showing a plot of C versus $\Delta\tau$ where $\Delta\tau$ is extended to $2T_c$ for R=0 dB.

FIG. 9 shows C versus Δτ, when Δτ is now extended to $2T_c$ for R=0 dB. The figure shows that detection of multipath components separated by more than a chip is also possible using our technique. However, it becomes more difficult as the delay, Δτ, exceeds $T_c$. This range, $\Delta\tau > T_c$, is not of much significance as rays separated by more than $T_c$ are usually resolvable by peak-picking techniques.

Figure 10:
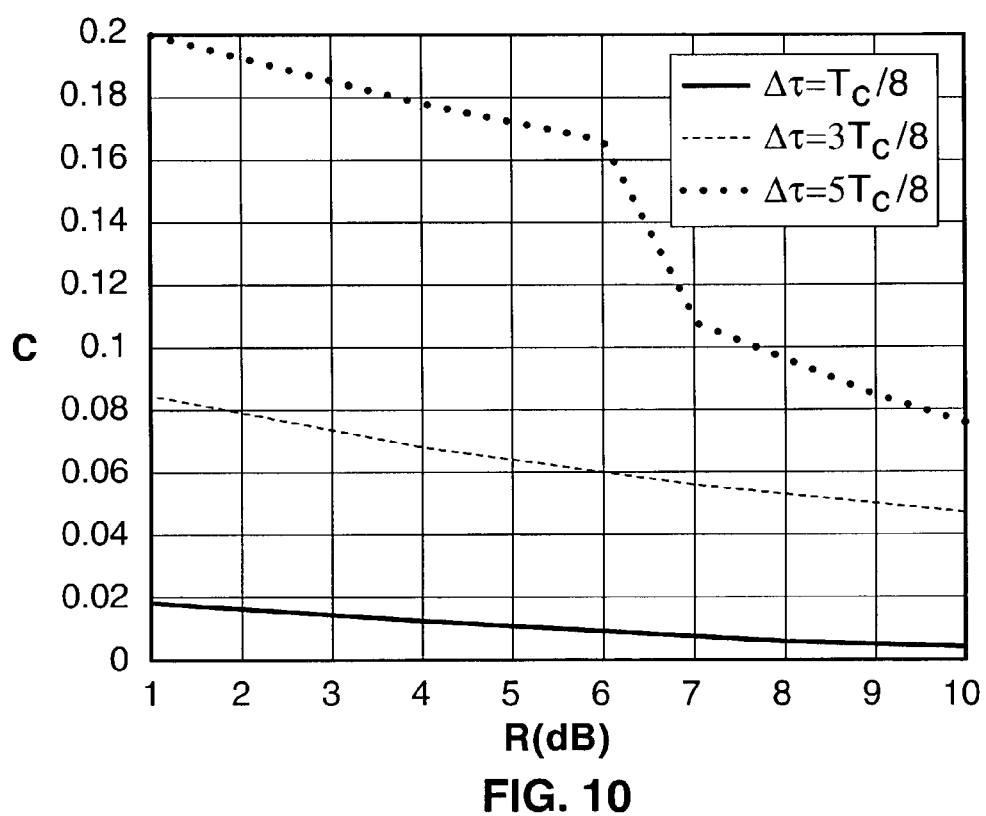
FIG. 10 is a graph showing a plot of C versus R for different values of $\Delta\tau$.

FIG. 10 shows C versus the ratio between the power of the first and second rays (R) for three different values of Δτ. The figure shows that C decreases with R. That is, it is easier to detect multipath components if their powers are comparable. If most of the received signal power is concentrated in one ray, it becomes more difficult to detect the existence of the other ray and vice versa.

Figure 11:
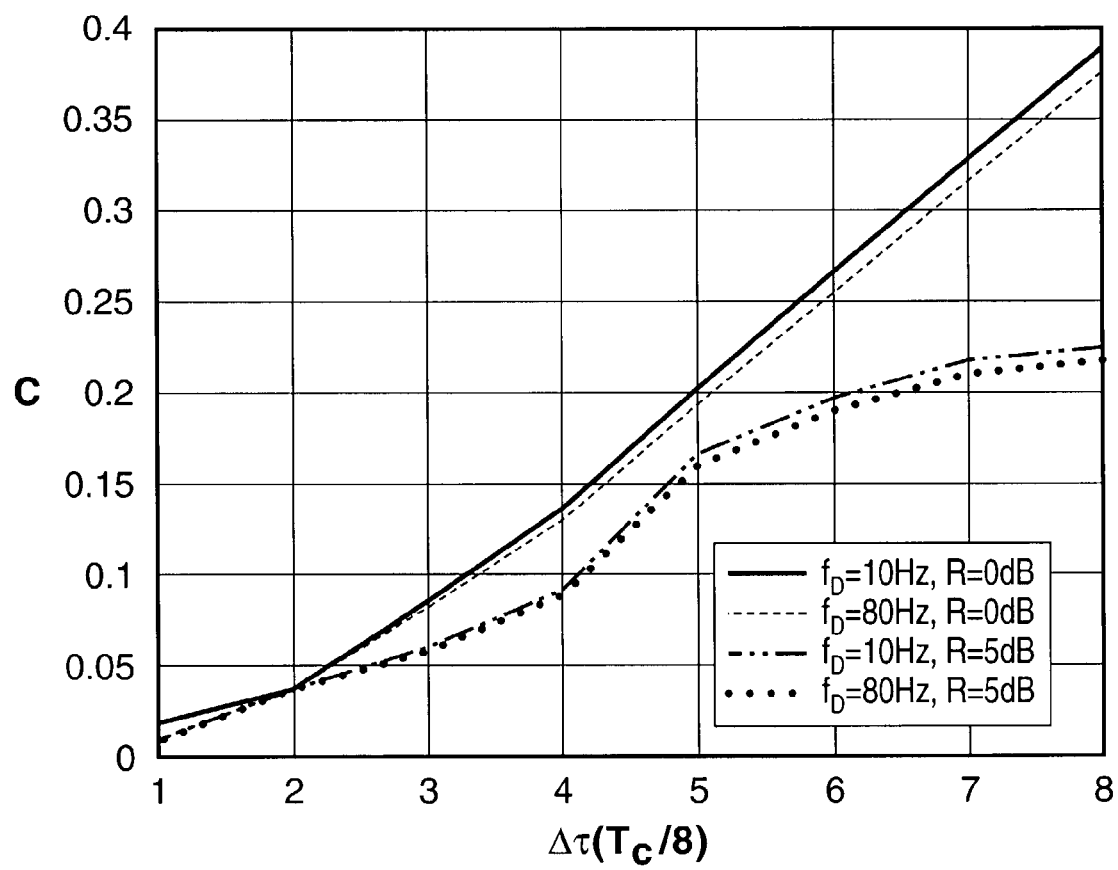
FIG. 11 is a graph showing a plot of C versus $\Delta\tau$ for two different values of $f_D$ (10 Hz and 80 Hz) and two values of R (0 dB and 5 dB).

FIG. 11 shows C versus Δτ for two different values of $f_D$(10 Hz and 80 Hz) and two values of R(0 and 5 dB). The figure shows that C decreases slightly with $f_D$. However, the change in C is minor despite the wide change in $f_D$. This indicates that C is not affected greatly by the value of $f_D$. This is due to the fact that $B_f$ does not vary much with $f_D$ if N is chosen at its optimal value given in Equation (27).

After investigating the properties of C, we arrive at the following property observation. The value of C and the optimal threshold, $\beta_{opt}$, both decrease with decreasing the delay between the two multipath components, Δτ, and with increasing the ratio between the power of the stronger ray and the power of the weaker ray. In fact, C goes to zero if $\Delta\tau \to 0$ or $R \to \infty$. This is expected as both cases correspond to the case of single path propagation. Thus, in order to set a value for the threshold, β, we have to set a minimum delay resolution, $\Delta_{min}$, below which we do not wish to detect overlapping rays (say $T_c/8$ or so). Rays separated by less than this delay will not be detected. Moreover, we also set a limit for the ratio between the powers of the two rays ($R_{max}$) (say 5 dB). In other words, if the power of the weaker ray is smaller than the power of the stronger ray by more than 5 dB, it will not be detected. Both $\Delta\tau_{min}$ and $R_{min}$ are design parameters that are based on the specific application. This approach is reasonable since resolving rays separated by a relatively small delay (less than $T_c/8$) is impractical for current CDMA systems. By setting the threshold β to this worst case, it becomes robust to the cases in which $\tau > \Delta\tau_{min}$ and $R < R_{max}$, i.e., we expect the probability of multipath detection to be larger in these cases.

Once we set $\Delta\tau = \Delta\tau_{min}$ and $R = R_{max}$, we can solve for $\tau_1$ and $\tau_2$ in this worst case (denoted by $\bar{\tau}_1$ and $\bar{\tau}_2$), which are calculated as follows. The peak index $\tau_p=\tau_1+\bar{\tau}_1$, for any arbitrary value of $\tau_1$, is calculated from $$\tau_p = \tau_1 + \bar{\tau}_1 = \underset{\tau}{\operatorname{argmax}}\left(p(\tau-\tau_1) + \frac{1}{R}p(\tau-\tau_1-\Delta\tau_{\min})\right).$$

Setting $\tau_1$ to zero, we get $$\bar{\tau}_1 = \underset{\tau}{\operatorname{argmax}}\left(p(\tau) = \frac{1}{R}p(\tau-\Delta\tau_{\min})\right), \quad (29)$$

$$\bar{\tau}_2 = \Delta\tau_{\min} + \bar{\tau}_1,$$

where $p(\tau)$ is the pulse-shaping waveform. The ray amplitudes in this worst case design ($\bar{\alpha}_1$ and $\bar{\alpha}_2$) are then obtained from the value of the maximum of the cost function $J(\tau_p)$ in Equation (3). Using Equation (17) and Equation (3), we obtain $$J(\tau_p) = \alpha_1^2 B_f R_p^2(\bar{\tau}_1) + \frac{1}{R^2}\alpha_1^2 B_f R_p^2(\bar{\tau}_2) + \frac{\sigma_v^2}{N}.$$

Thus $\bar{\alpha}_1$ and $\bar{\alpha}_2$ are given by $$\bar{\alpha}_1 = \sqrt{\frac{J(\tau_p) - \sigma_v^2/N}{B_f R_p^2(\bar{\tau}_1) + \frac{1}{R^2}B_f R_p^2(\bar{\tau}_2)}}, \quad (30)$$

$$\bar{\alpha}_2 = \frac{1}{R}\bar{\alpha}_1.$$

A worst case value for the threshold, $\beta$, can now be obtained by substituting Equation (29) and Equation (30) into Equation (28). This value, which we denote by $\beta_w$, is given by $$\beta_w = \frac{1}{2}\left(\bar{\alpha}_1^2 \beta_{f1} \frac{T_s'}{T_c} \sum_{\delta\tau=T_s}^{T_c}(R_p(\delta\tau+\bar{\tau}_1) - R_p(\delta\tau-\bar{\tau}_1))^2 + \bar{\alpha}_2^2 \beta_{f2} \frac{T_s}{T_c} \sum_{\delta\tau=T_s}^{T_c}(R_p(\delta\tau+\bar{\tau}_2) - R_p(\delta\tau-\bar{\tau}_2))^2\right). \quad (31)$$

Simulation Results

The performance of the proposed technique is evaluated by computer simulations. In the simulations, a typical IS-95 signal is generated, pulse-shaped, and transmitted through a multipath Rayleigh fading channel. The total power gain of the channel components is normalized to unity. The delay between the two multipath components is chosen to be multiples of $T_c/8$. Both multipath components fade independently at a maximum Doppler frequency of $f_D$. Additive white Gaussian noise is added at the output of the channel to account for both multiple access interference and thermal noise. The received chip energy-to-noise ratio ($E_c/N_o$) of the input sequence r(n), is varied in the range of $-10$ dB to $-20$ dB, which is common for CDMA IS-95 systems.

Figure 12:
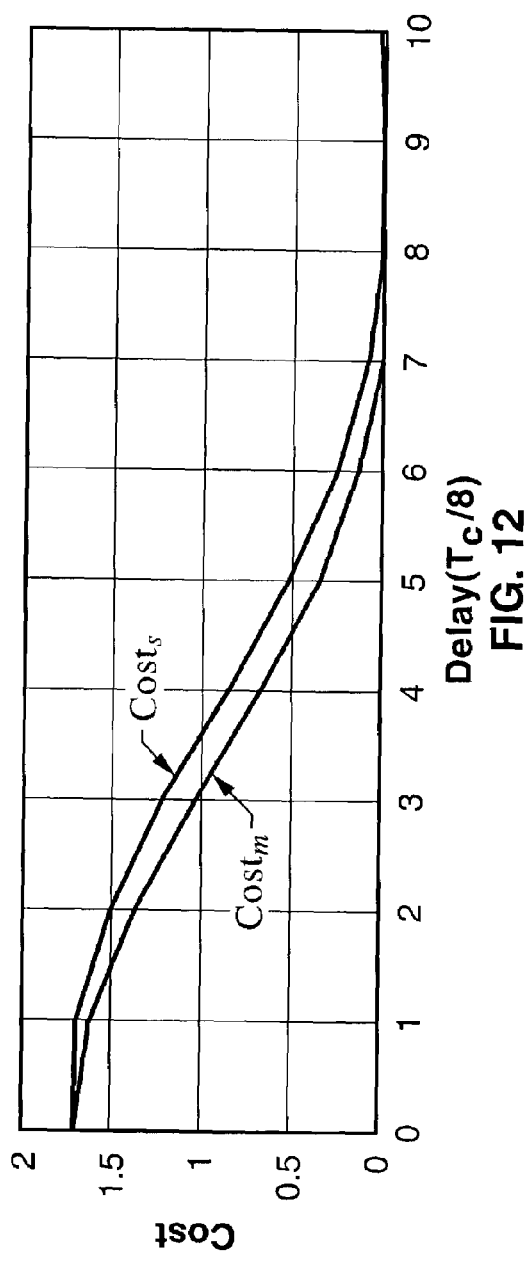
FIG. 12 is a graph showing a plot of the single and multipath cost functions of the present invention versus delay for two rays.
Figure 13:
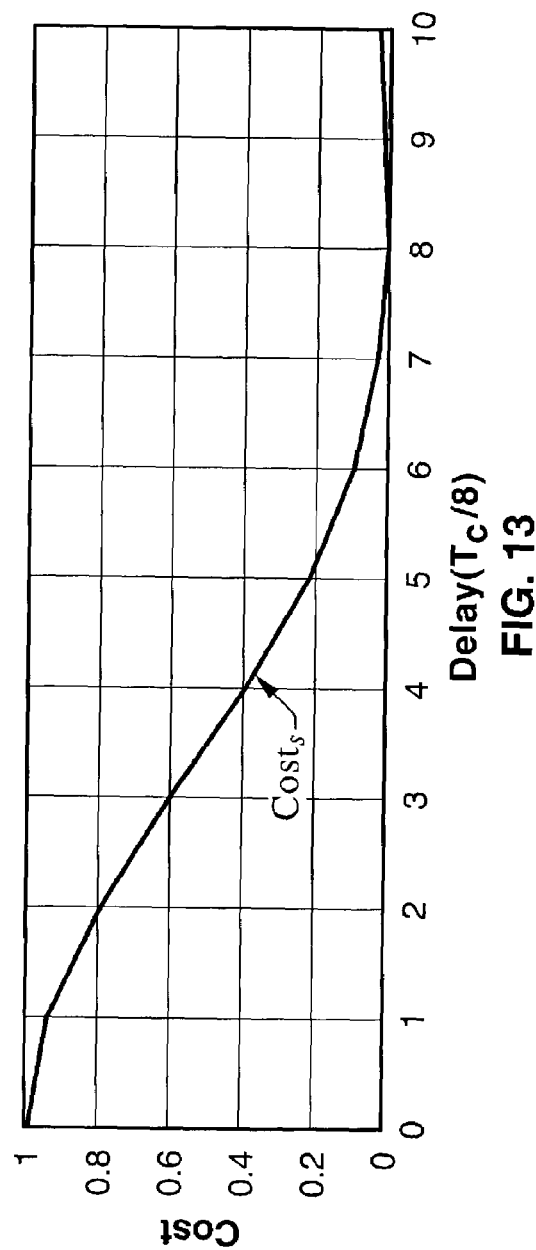
FIG. 13 is a graph showing a plot of the single and multipath cost functions of the present invention versus delay for one ray.

FIG. 12 and FIG. 13 show the single and multipath cost functions, $J_s(\delta_\tau)$ and $J_m(\delta_r)$, versus the delay index $\delta_\tau$ in two cases for $E_c/N_o=-15$ dB and $f_D=80$ Hz. In FIG. 12, where two equal multipath components separated by $T_c/8$ exist, we can see that $J_s(\delta_\tau) > J_m(\delta_\tau)$. In FIG. 13, where only one ray exists, the two cost functions coincide.

Effect of R on $P_d$

Figure 14:
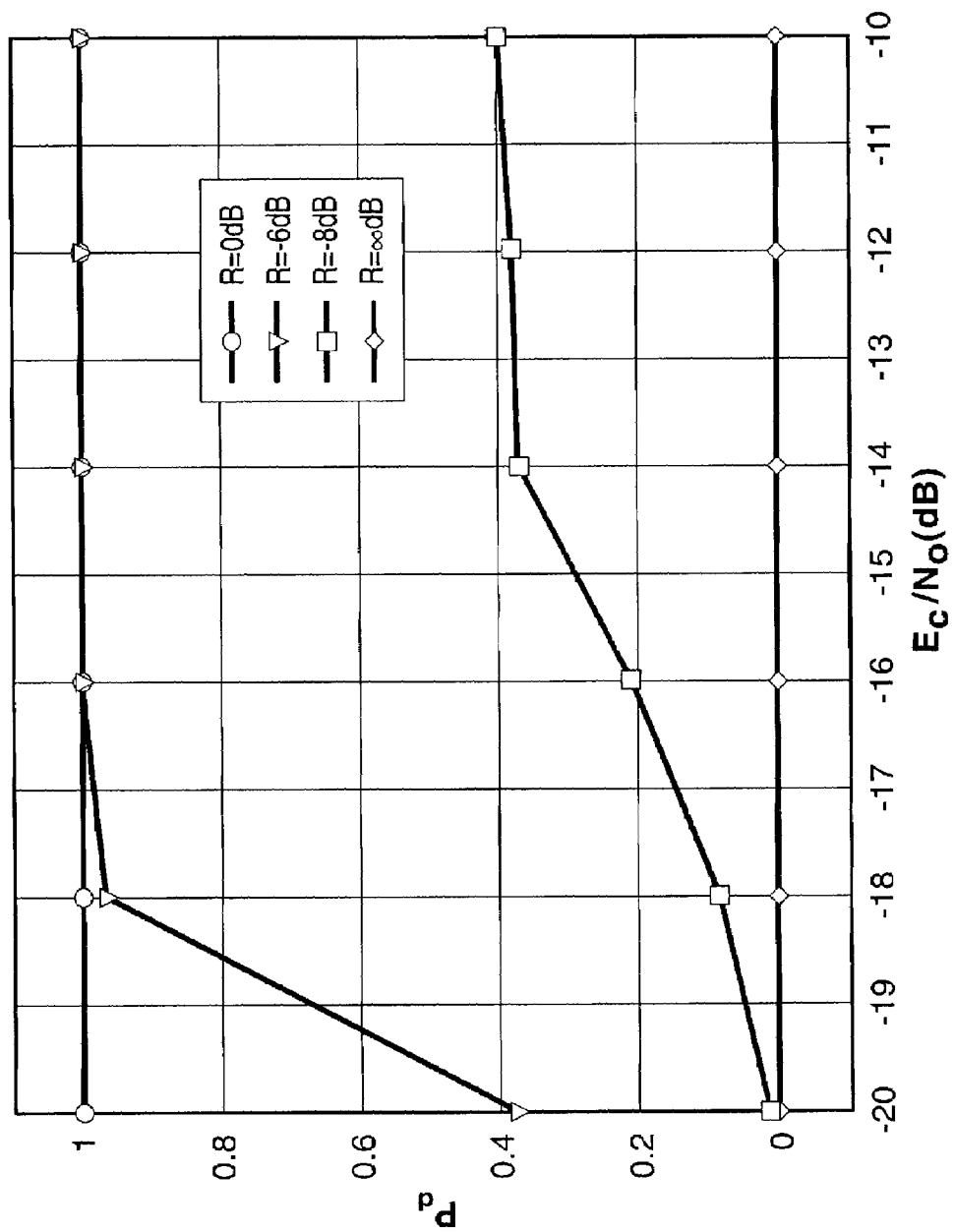
FIG. 14 is a graph showing a plot of probability ($P_d$) of multipath detection versus $E_c/N_o$ for different values of R.

FIG. 14 and Table 1 show the probability of multipath detection ($P_D$) versus $E_c/N_o$ for four different values of the ratio between the prompt ray power and the overlapping ray power (R(dB)=20 $\log_{10}(\alpha_1/\alpha_2)$). In these simulations, the delay between the two rays is equal to $T_c/8$, $\beta=0.001$, and the probability $P_D$ is calculated as the average of 100 runs. For R=0 dB (equal rays), $P_d$ is approximately equal to unity for the chosen range of $E_c/N_o$. On the other hand, $P_d$ is approximately equal to zero for R=$\infty$ (single-path propagation). Thus the invention can successfully distinguish between single-path and multipath propagation, even for low values of $E_c/N_o$.

Effect of $\Delta\tau$ on $P_d$

Figure 15:
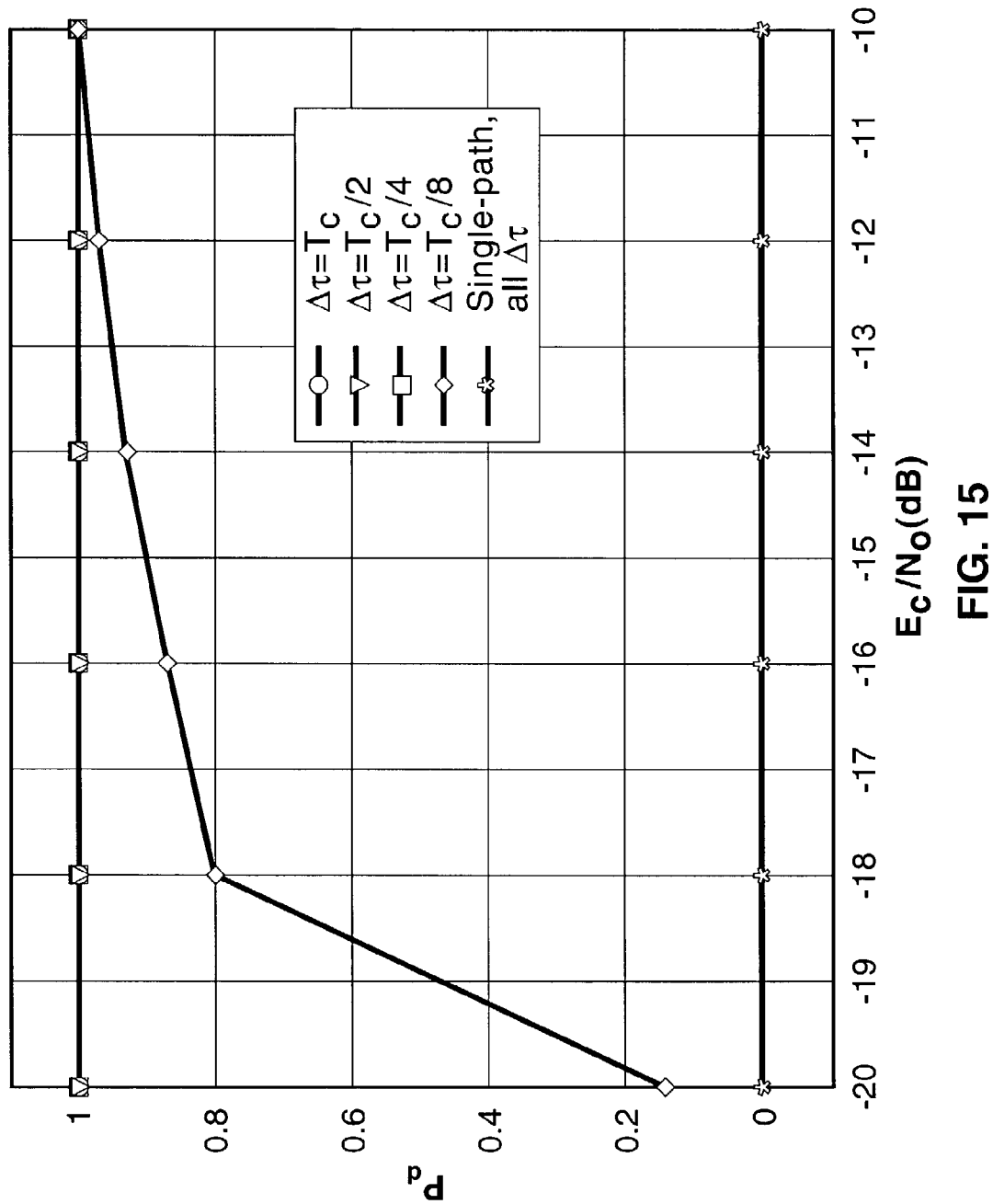
FIG. 15 is a graph showing a plot of probability ($P_d$) of multipath detection versus $E_c/N_o$ for different values of $\Delta\tau$.

FIG. 15, Table 2 and Table 3 show the probability of multipath detection ($P_d$) versus $E_c/N_o$ for four different values of the delay between the two rays, $\Delta\tau$. In this simulation, the ratio between the prompt ray power and the overlapping ray power, R, is set to $-5$ dB for the multipath case (Table 2) and $\infty$ for the (single-path) case (Table 3), $\beta=0.0042$, and the probability $P_d$ is calculated as the average of 100 runs. It can be seen from the these results that the invention has perfect detection probability except at very low values of $E_c/N_o$ and $\Delta\tau$ at the edge of our design, $\Delta\tau=T_c/8$.

Effect of M on $P_d$

Figure 16:
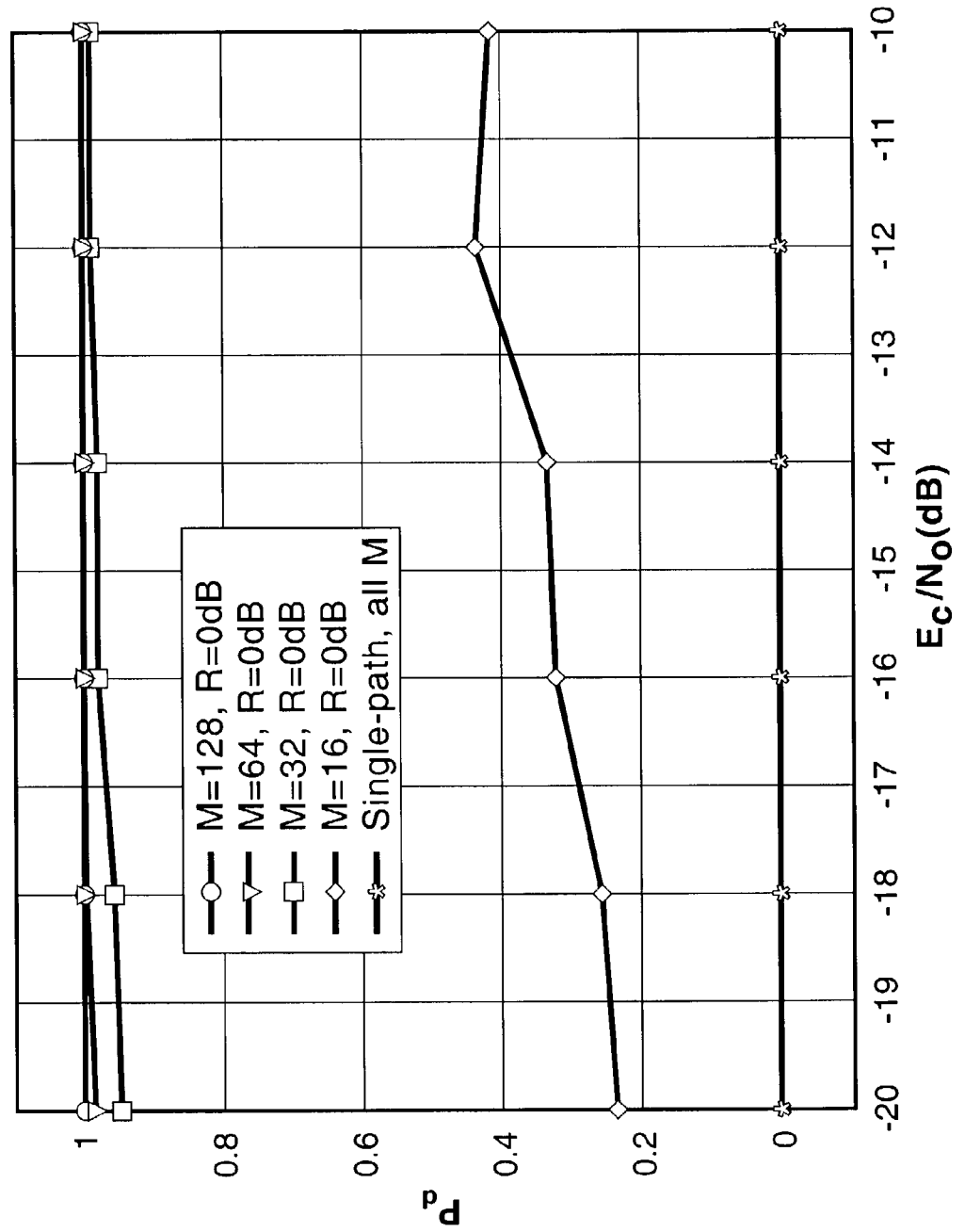
FIG. 16 a graph showing a plot of probability ($P_d$) of multipath detection versus $E_c/N_o$ for different values of M.

In our analysis, we made the assumption that the length of the noncoherent integration period, M, goes to infinity, i.e., an infinitely long received sequence. It is thus desirable to check the performance of the proposed detection technique for finite length received sequences, i.e., for practical values of M. FIG. 16, Table 4 and Table 5 show the effect of varying M on the probability of multipath detection, $P_d$ for multipath R=0 db (Table 4) and single-path R=$\infty$ db (Table 5) cases. Here it can be seen that the precision of the detection process increases with M. This is expected as the precision of the noise variance estimate increases with M and also the assumption that the channel multipath components fade independently, which is heavily exploited in our analysis and which is given by Equation (5), is not feasible unless a long enough received sequence is used, i.e., for long enough M. Note also that the results reflect that for the conditions described above, a very high probability of detection can be achieved for M larger than sixty-four, which is a very reasonable value in practice, i.e., it corresponds to a reasonable data collection duration (around 0.4 second in this case). For R=0 dB, the probability of detection is zero for all the considered values of M, i.e., no false alarm was ever noticed in these simulations. This is because no independent fading needs to be exploited in the single-path case, as only one ray exists. Thus, a relatively smaller value of M can guarantee that no false alarm occurs. This is in fact a nice property of the proposed detection method as a false alarm could be much more damaging to the estimation process than not detecting existing overlapping multipath components.

Mobile-Positioning Application

Figure 17:
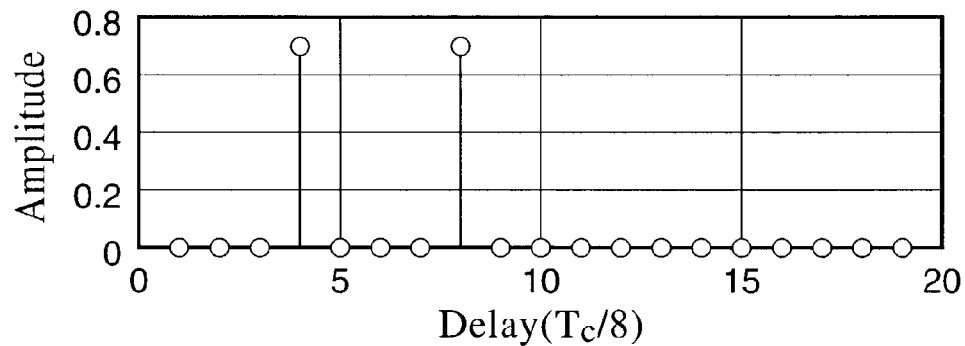
FIG. 17 through FIG. 20 are graphs showing the impact of using a-priori multipath information on multipath resolving for a Rayleigh fading channel having two rays with a maximum Doppler frequency of 10 Hz.
Figure 18:
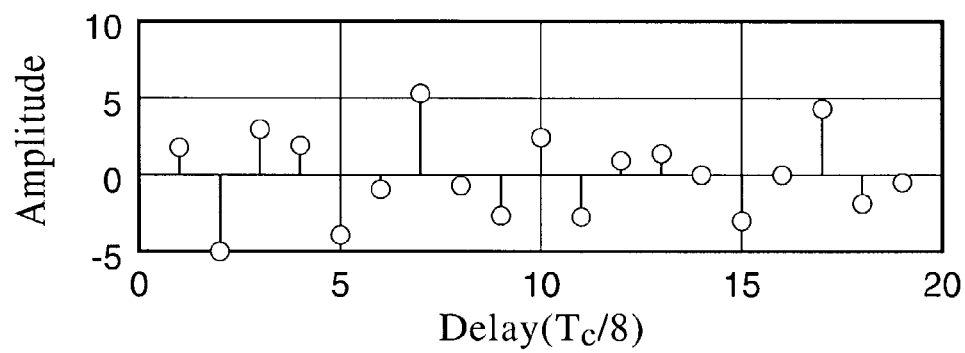
Figure 19:
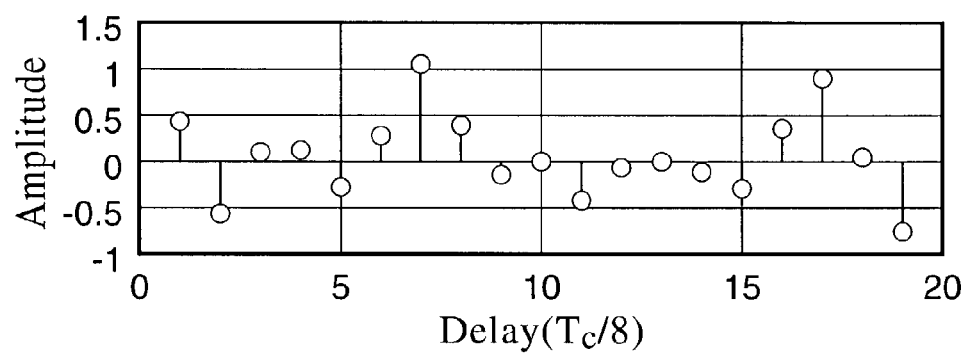
Figure 20:
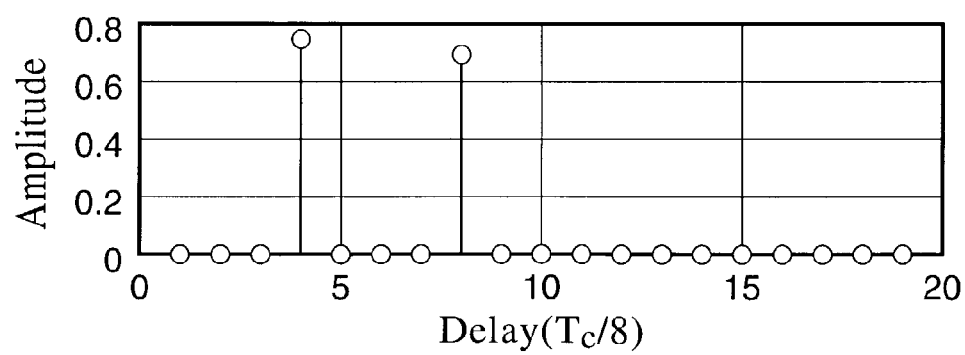

The impact of using the a-priori multipath information obtained from the present invention on overlapped multipath resolving techniques is reflected by the simulation results given in FIG. 17 through FIG. 20. In these results, a Rayleigh fading channel is considered. The channel consists of two Rayleigh fading rays with a maximum Doppler frequency of 10 Hz. The two rays are shown in FIG. 17. An IS-95 pulse-shaped CDMA signal is transmitted over this channel. The signal-to-noise ratio at the output of the channel is −10 dB. The delay between the two rays corresponds to $T_c/4$. FIG. 18 shows the output of a conventional matched filtering stage followed by a conventional least-squares deconvolution stage. It is clear that the amplitude of the signal at the output of such a procedure is significantly degraded leading to significant errors in the estimation of the time and amplitude of arrival of the first arriving ray. FIG. 19 shows the estimated channel if a regularized least-squares operation is used instead of the conventional least-squares operation. Again we can see that this method fails in resolving an accurate estimate for the channel. Finally, FIG. 20 shows the estimated channel when a constrained least-squares operation is used. Here, the least-squares channel estimate is constrained to the convex set that contains only two rays. In this case, it can be seen that the 1-priori information provided by the present invention serves to enhance the channel estimate significantly. Furthermore, it can be seen that conventional least-squares techniques suffer from high levels of noise enhancement. Thus, the present invention can totally avoid these errors in the case of single path propagation, when no overlapping multipath components are detected.

Adaptive Multipath Resolving

While the invention described thus far is efficient for resolving overlapping multipath components, the method can be enhanced using an adaptive technique. This technique involves replacing the least-squares operation needed for resolving overlapping multipath components with a gradient-based adaptive filtering operation. As an additional enhancement, a new projection technique is provided that exploits all possible a-priori channel information into the adaptive filtering algorithm, thus providing needed robustness to divergence of the adaptive algorithm that might result from possible severe data matrix ill-conditioning and high noise levels, which are common in wireless location applications.

Accordingly, this embodiment of the invention comprises an adaptive projection method for channel estimation. The technique exploits all possible a priori channel information in the adaptive channel estimation recursion. The technique uses a general block least-squares estimation scheme and replaces the least-squares operation by an adaptive filter, which exploits all possible a priori channel information in its recursion.

The steps associated with this embodiment of the method, which we refer to as adaptive projection multipath resolving, can be summarized as follows:

1. The received signal r(n) is applied to a bank of matched filters s(n−τ), each with a different delay, i.e., r(n) is multiplied by locally generated replica of the pulse-shaped transmitted sequence s(n−τ), at various values of delay τ.

2. A parallel to serial converter is applied to the output of the matched filter bank s(n−τ), to form the signal d(i).

3. An adaptive filter of weight vector $h_I$ is used to estimate the channel multipath components at the $i^{th}$ iteration. The input regressor to the adaptive filter $u_i$ is formed using delayed replica of the known transmitted pulse shape.

4. Successive projections are applied to the adaptive filter weight vector $h_i$ every $N_p$ iterations, in the following general form.

$$h_{i+1} = Pr[h_i + \mu(i)u_{i+1}(d(i+1) - u_{i+1}h_i)], \quad i = N_p, 2N_p, \ldots$$
$$= h_i + \mu(i)u_{i+1}(d(i+1) - u_{i+1}h_i), \quad i \neq N_p, 2N_p, \ldots$$

Here $N_p$ is an integer greater than or equal to one and less than or equal to the total number of iterations performed. Note that by altering $\mu(i)$, the projection recursion becomes a modified version of a corresponding adaptive filtering algorithm. For example, if $\mu$ is a constant, the method becomes a modified version of the LMS algorithm.

Figure 21:
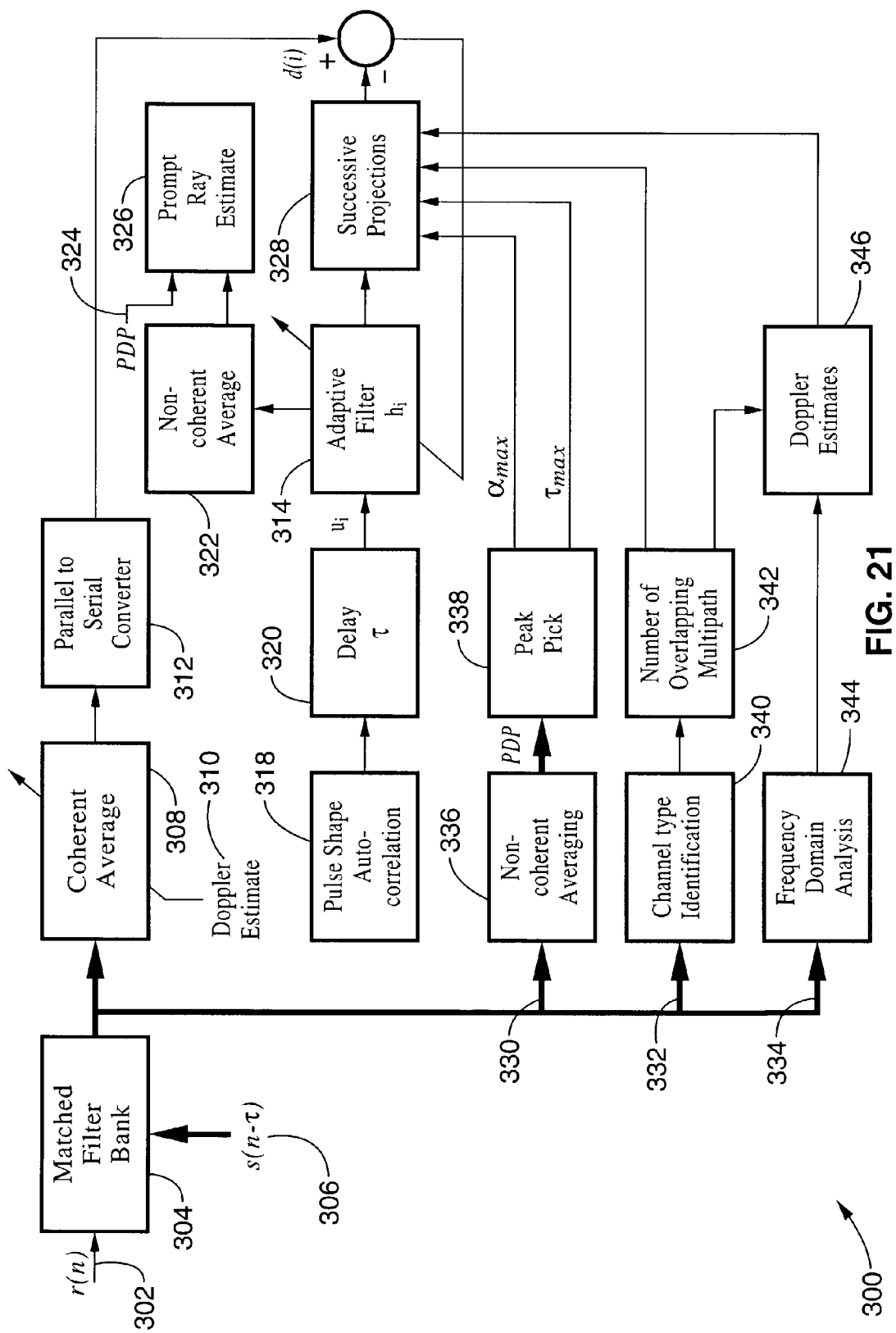
FIG. 21 is a functional block diagram depicting an embodiment of an adaptive method and apparatus for channel estimation according to the present invention.
Figure 22:
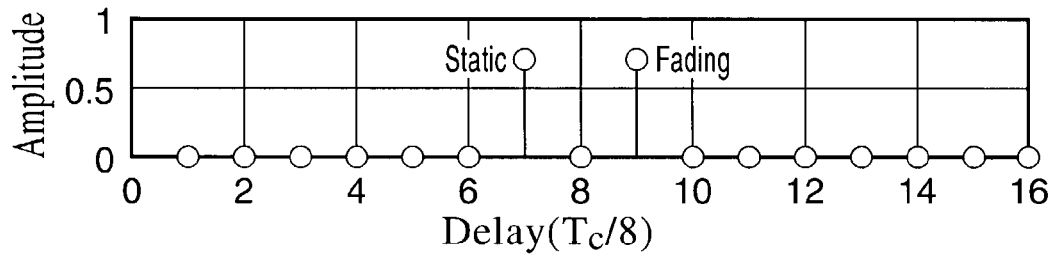
FIG. 22 is a graph showing a simulated static channel used in evaluating the adaptive method and apparatus for channel estimation according to the present invention.
Figure 23:
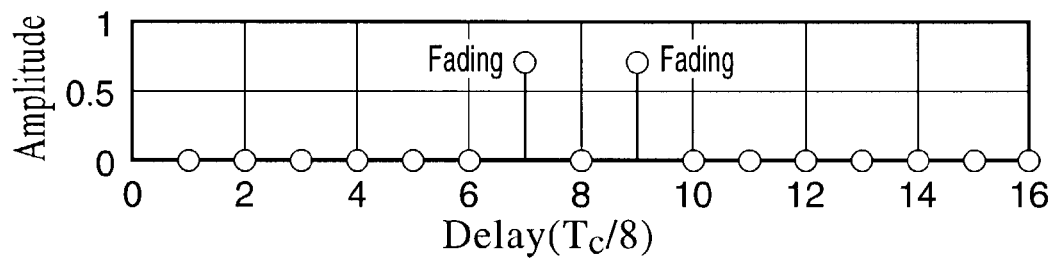
FIG. 23 is a graph showing a simulated fading multipath channel used in evaluating the adaptive method and apparatus for channel estimation according to the present invention.
Figure 24:
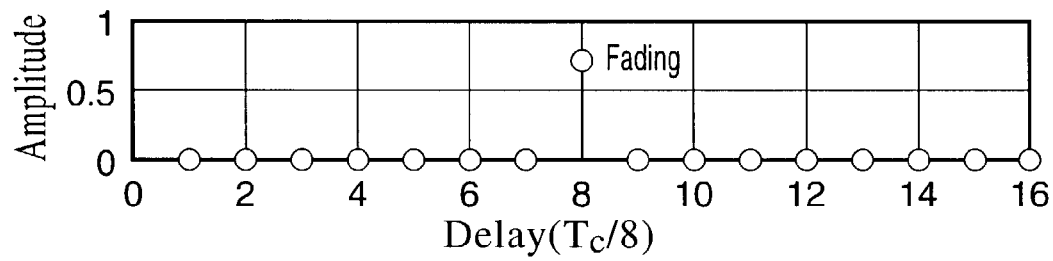
FIG. 24 is a graph showing a simulated fading single path channel used in evaluating the adaptive method and apparatus for channel estimation according to the present invention.
Figure 25:
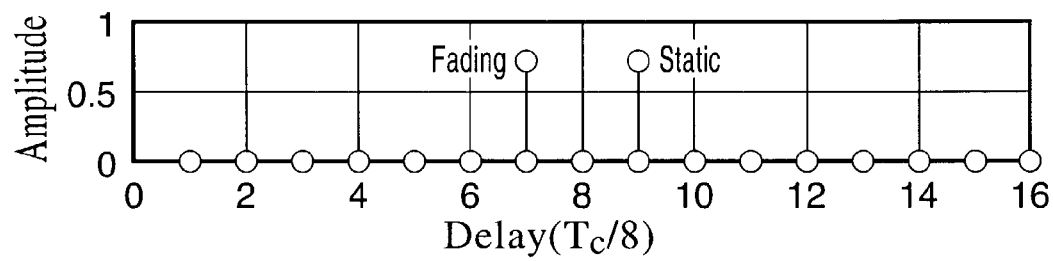
FIG. 25 is a graph showing a simulated hybrid channel used in evaluating the adaptive method and apparatus for channel estimation according to the present invention.
Figure 26:
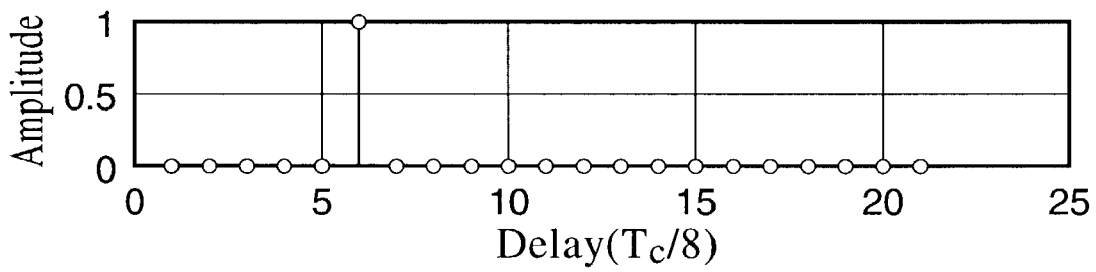
FIG. 26 through FIG. 29 are graphs showing simulated amplitude ratio combinations, Channels A through D, respectively, used in evaluating the adaptive method and apparatus for channel estimation according to the present invention.
Figure 27:
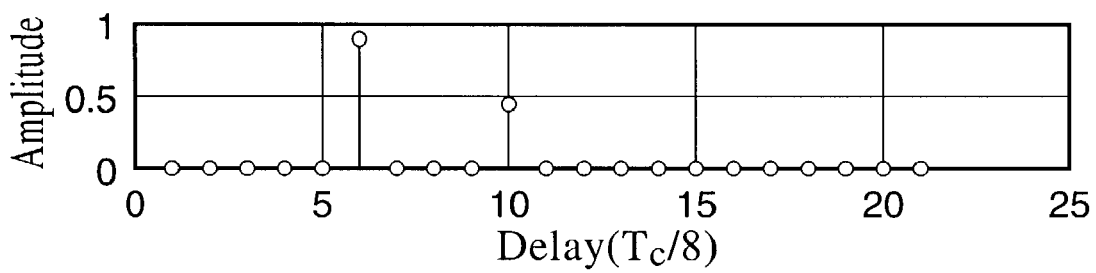
Figure 28:
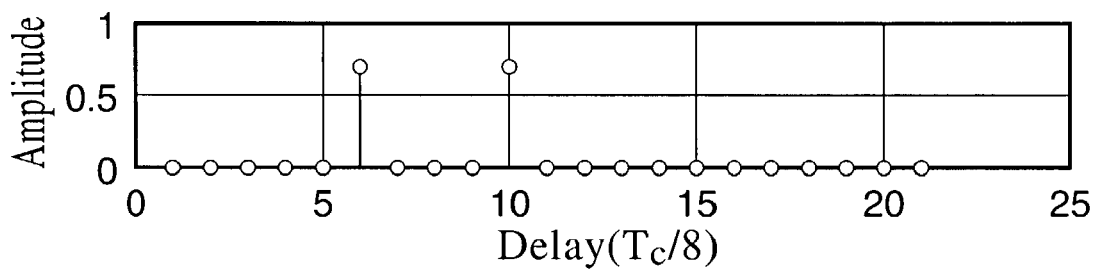
Figure 29:
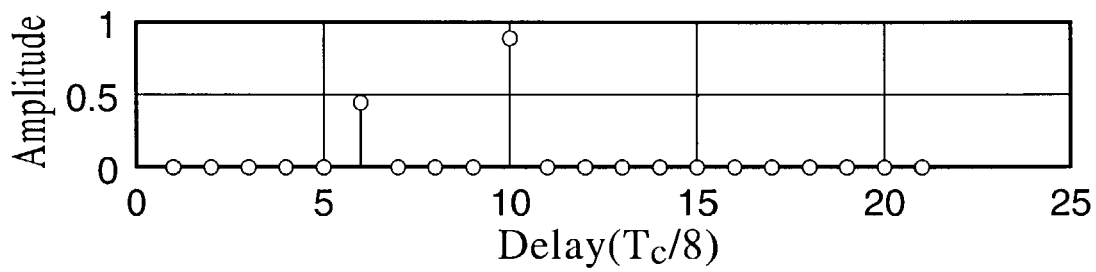

Referring more particularly to the block diagram 300 shown in FIG. 21, the received signal r(n) 302 is applied to a bank 304 of matched filter s(n−τ) 306, each with a different delay τ. A coherent averaging stage 308 using a Doppler estimate 310 and a parallel to serial converter 312 are applied to the output of the matched filter bank to form the signal d(i). An adaptive filter 314 of weight vector $h_I$ is used to estimate the channel multipath components at the $i^{th}$ iteration. The input regressor to the adaptive filter $u_i$ 316 is formed using a delayed replica of the known transmitted pulse shape from pulse shape auto-correlation stage 318 and delay stage 320. The output of adaptive filter 314 is applied to a non-coherent averaging stage 322. The output of the non-coherent averaging stage 322 as well as the PDP 324 are applied to a prompt ray estimating stage 326.

Successive projections at block 328 are based on the output of adaptive filter 314 and information obtained from the lower three branches 330, 332, 334. The first branch 330 extracts information about the channel region of support and maximum amplitude. This information is extracted by applying the output of the matched filter bank 306 to a non-coherent averaging stage 336 and peak pick stage 338.

The second branch 332 applies the output of the matched filter bank 306 to a channel type identification stage 340 and overlapping multipath number identification stage 342 to detect the channel type as well as the existence of overlapping multipath components and estimating their number as described in the previous embodiment. The first channel parameter to be extracted from the received signal is the fading nature of the first arriving ray. This prompt ray could either be static (non-fading), Rayleigh fading, or Rician fading (a combination of static and Rayleigh fading components). Furthermore, an overlapping ray of a different fading nature could succeed the prompt ray. For example, a static prompt ray could be followed by an overlapping Rayleigh fading ray or vice versa. Knowing the fading nature of the multipath channel can be very valuable in the way the overlapping multipath components are resolved. This information can be extracted by comparing two power delay profiles. Both profiles differ in the used coherent averaging interval used.

The third branch 334 extracts frequency domain a-priori channel information, such as Doppler frequency information, by transforming the output of the matched filter bank 324 into the frequency domain, through a fast Fourier transform (FFT) stage 344 and Doppler estimation stage 346 for example, to obtain a three dimensional power-delay-frequency profile (spectrogram).

The adaptive filter weight vector is successively projected on the set of all possible elements satisfying the constraints obtained from the three branches at block 328. Further, the adaptive filter weight vector is iterated till it reaches steady state.

The weight vector is then averaged non-coherently at block 322 to avoid any possible attenuation in the amplitude of the output signal due to changes in the channel phase. The output of the non-coherent averaging is then used to obtain the time and amplitude of arrival of the prompt ray at block 326.

Simulation Results

The robustness of the adaptive method for resolving overlapping multipath components was tested using computer simulations. In the simulations, a typical IS-95 signal was generated, pulse-shaped, and transmitted through a multipath various channels. The total power gain of the channel components was normalized to unity. Four different channel types, shown in FIG. 22 through FIG. 25 were considered. Furthermore four amplitude ratios between the prompt ray and the overlapping ray are considered. FIG. 26 through FIG. 29 show the different amplitude ratio combinations used in the simulations.

Figure 30:
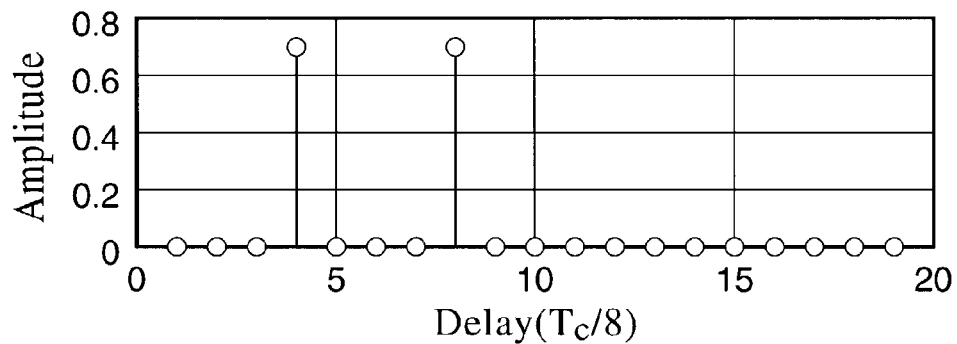
FIG. 30 through FIG. 33 are graphs comparing the output of the adaptive method and apparatus for channel estimation according to the present invention to conventional multipath resolving methods for a two-ray fading multipath channel.
Figure 31:
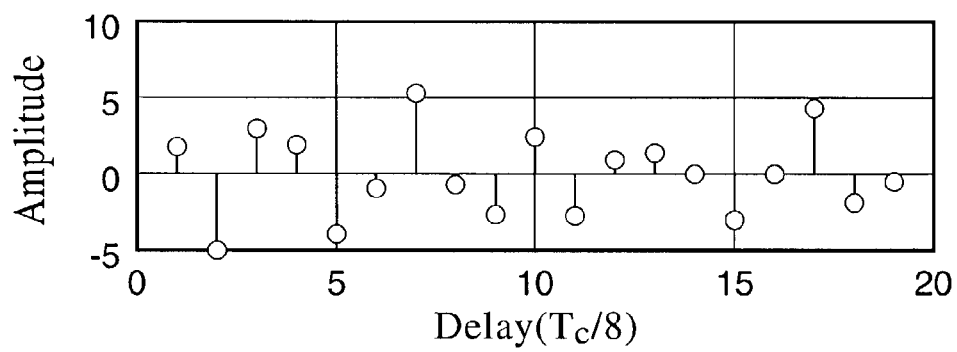
Figure 32:
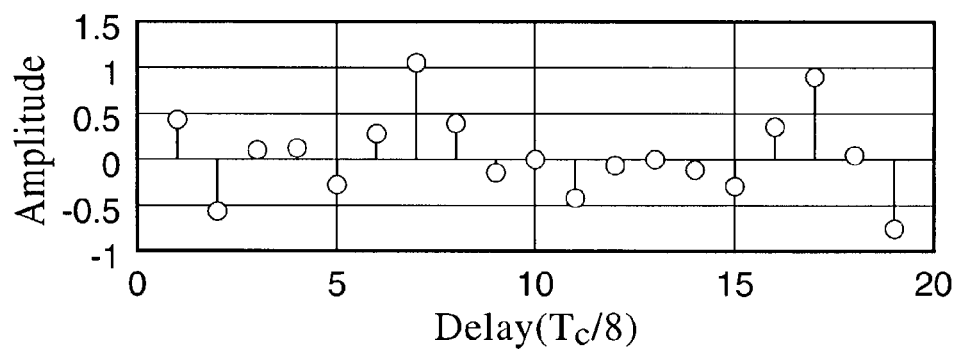
Figure 33:
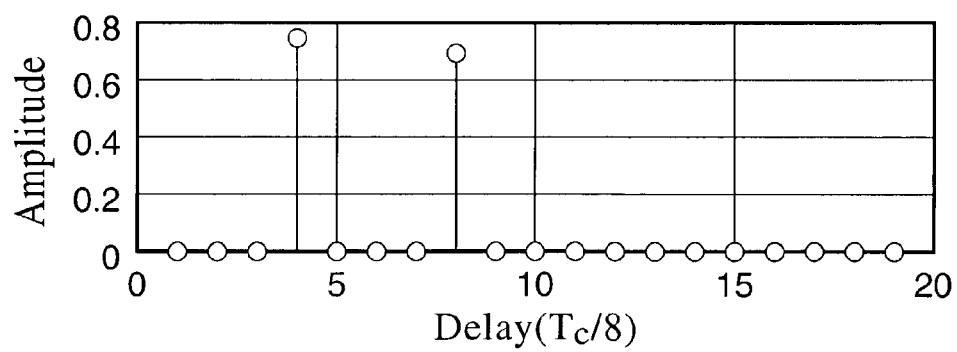
Figure 34:
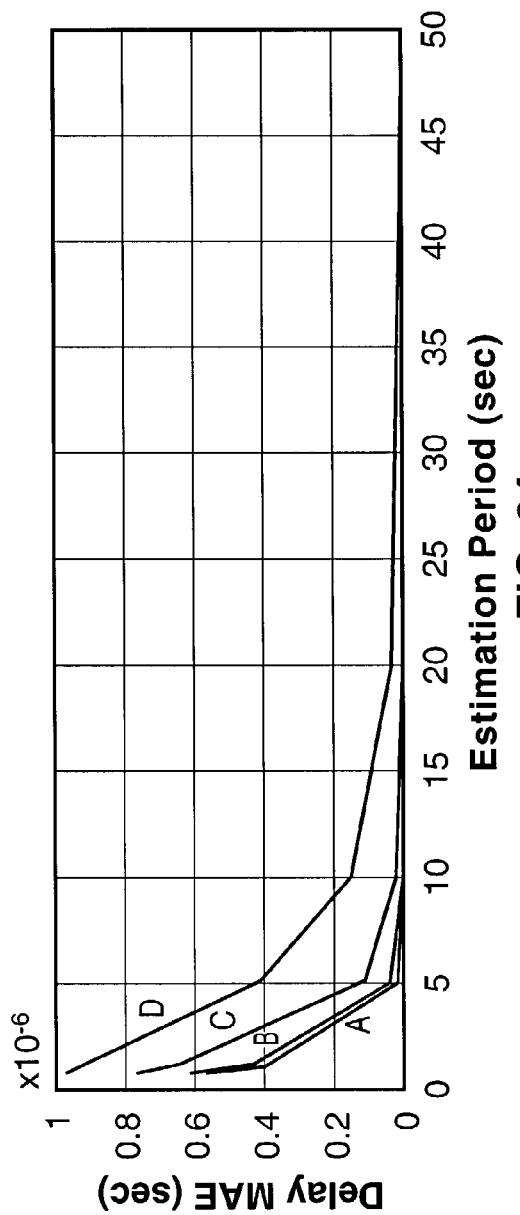
FIG. 34 is a graph showing the estimation time delay absolute mean square error versus time of the prompt ray for the four channels, A through D, shown in FIG. 26 through FIG. 29.
Figure 35:
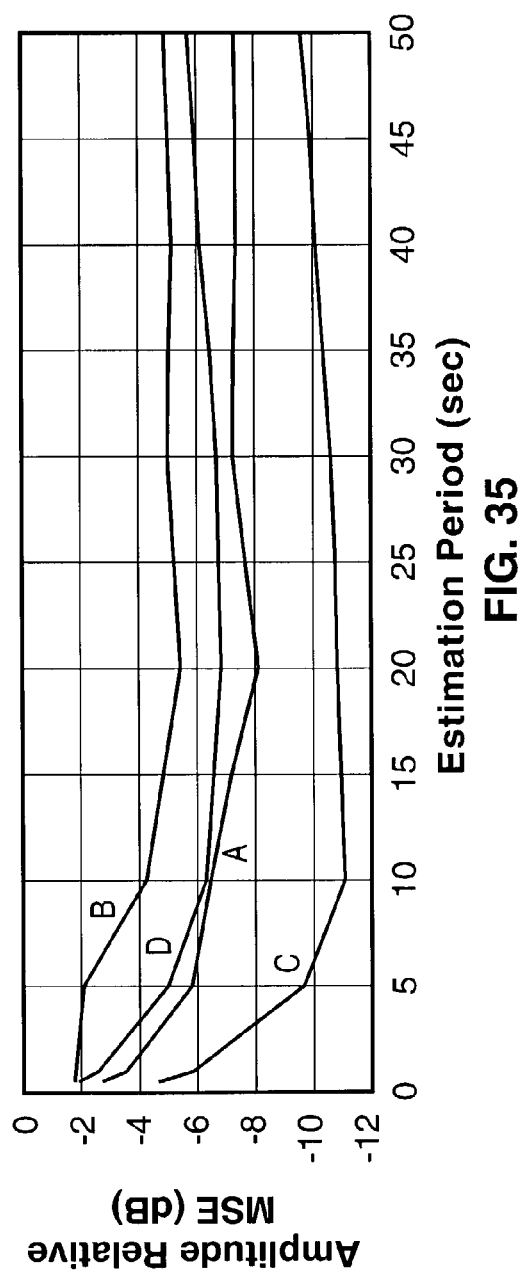
FIG. 35 is a graph showing the amplitude relative mean square error versus time of the prompt ray for the four channels, A through D, shown in FIG. 26 through FIG. 29.
Figure 36:
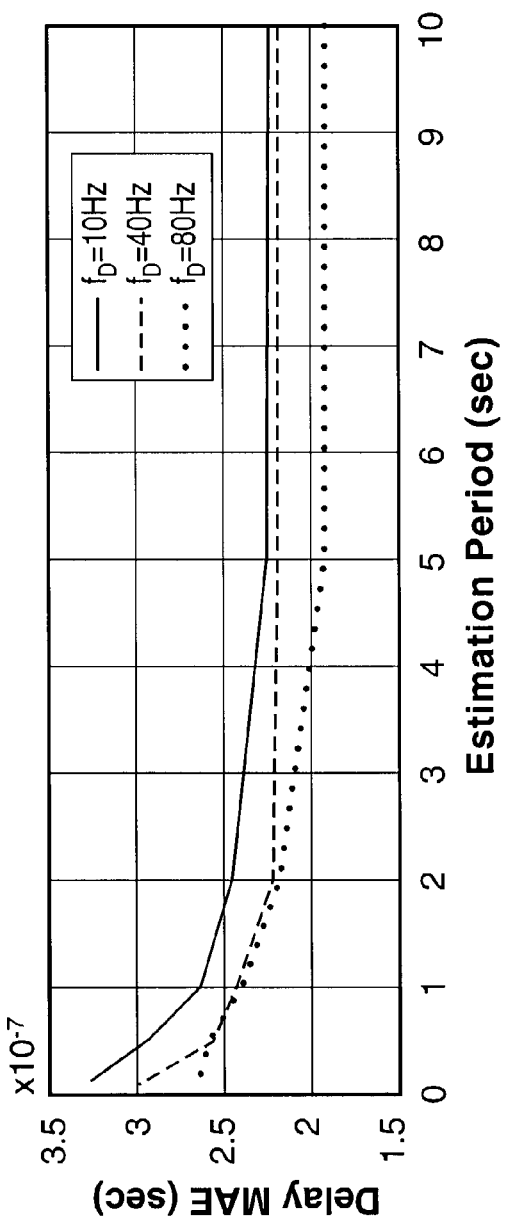
FIG. 36 is a graph showing the estimation time delay absolute mean square error versus time of the prompt ray for Channel B shown in FIG. 27.
Figure 37:
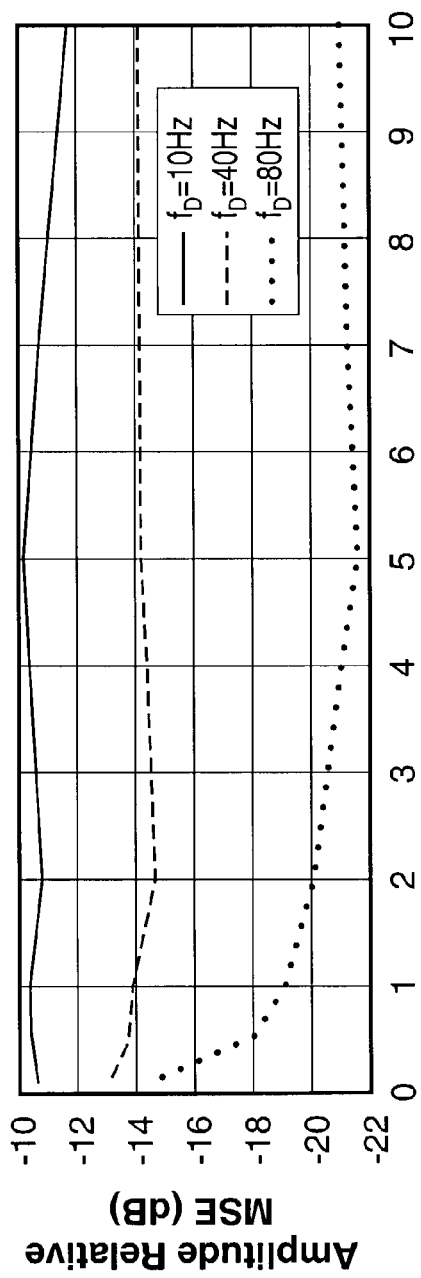
FIG. 37 is a graph showing the amplitude relative mean square error versus time of the prompt ray for Channel B showing in FIG. 27.
Figure 38:
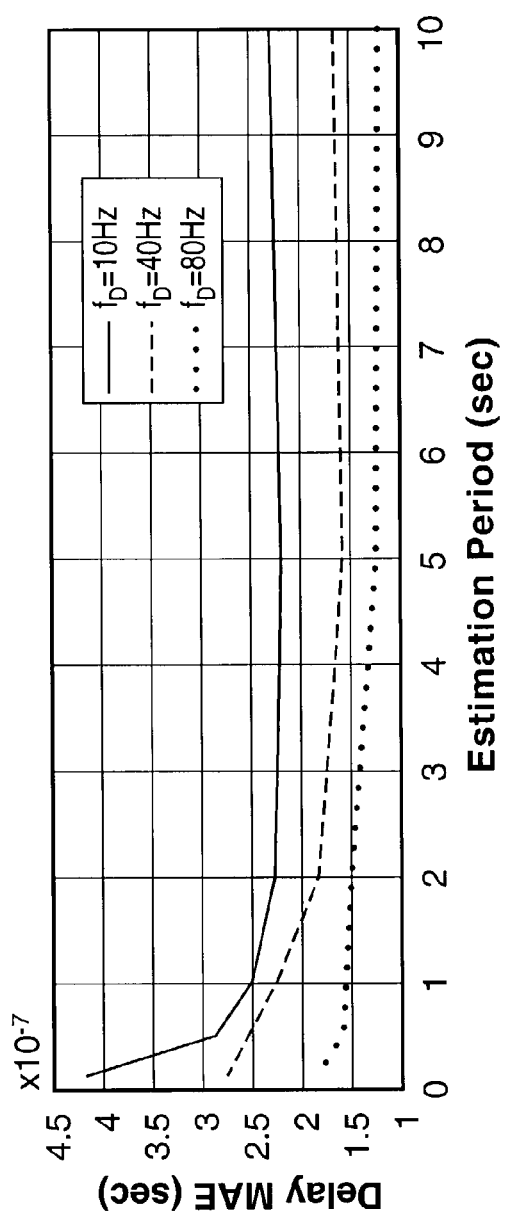
FIG. 38 is a graph showing the estimation time delay absolute mean square error versus time of the prompt ray for Channel C shown in FIG. 28.
Figure 39:
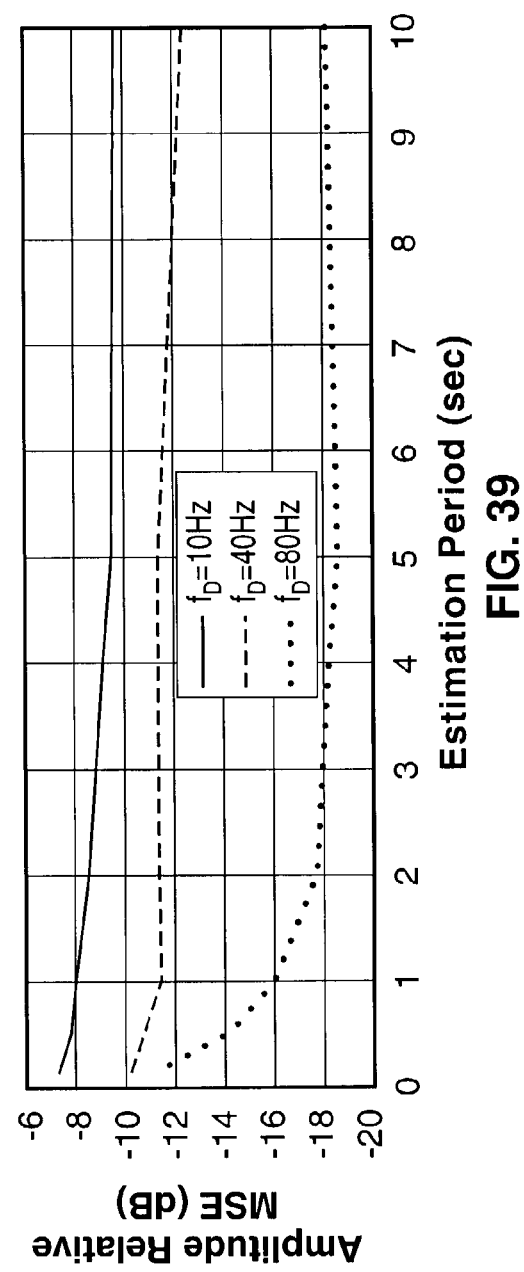
FIG. 39 is a graph showing the amplitude relative mean square error versus time of the prompt ray for Channel C showing in FIG. 28.

FIG. 30 through FIG. 33 show a sample simulation that compares the output of the proposed algorithm to conventional multipath resolving techniques for a two-ray fading multipath channel whose static amplitude response is shown in FIG. 30. FIG. 31 and FIG. 32, respectively, show the output of a conventional matched filtering stage followed by conventional least-squares and regularized least-squares deconvolution stages. It is clear that both conventional techniques lead to significant errors in the estimation of the time and amplitude of arrival of the first arriving ray. FIG. 33 shows the output of the proposed estimation scheme. It is clear that the proposed algorithm is significantly more accurate than conventional techniques.

FIG. 34 through FIG. 41 show the estimation time delay absolute error and amplitude mean square error of the prompt ray in various overlapping multipath propagation scenarios versus the estimation period (T). The simulations are performed for both static and fading overlapping multipath propagation cases, and for various values of the maximum Doppler frequency ($f_D$) and channel amplitude ratio. The results show a good ability of this adaptive method to resolve overlapping multipath components.

Those skilled in the art will appreciate the invention described herein can be easily and readily implemented using conventional analog and/or digital circuitry, communications circuitry, adaptive filters, hardware, software, and the like, and combinations thereof, as well as using conventional programmable data processors and programming techniques. Furthermore, although the description above contains many specificities, these should not be construed as limiting the scope of the invention but as merely providing illustrations of some of the presently preferred embodiments of this invention. Thus the scope of this invention should be determined by the appended claims and their legal equivalents.

Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

$P_d$ for different values of $E_c/N_o$ and R for $\Delta\tau = T_c/8$ and $\beta = 0.01$

| $E_c/N_o$ (dB) | −10 | −12 | −14 | −16 | −18 | −20 |
|---|---|---|---|---|---|---|
| R = 0 dB | 1 | 1 | 1 | 1 | 1 | 1 |
| R = −6 dB | 1 | 1 | 1 | 1 | 0.97 | 0.37 |
| R = −8 dB | 0.4 | 0.38 | 0.37 | 0.21 | 0.08 | 0.01 |
| R = ∞ dB | 0 | 0 | 0 | 0 | 0 | 0 |

TABLE 2

$P_d$ for different values of $E_c/N_o$ and $\Delta\tau$ for R = −5 dB, M = 128 and $\beta = 0.0042$

| $E_c/N_o$ (dB) | −10 | −12 | −14 | −16 | −18 | −20 |
|---|---|---|---|---|---|---|
| $\Delta\tau = T_c$ | 1 | 1 | 1 | 1 | 1 | 1 |
| $\Delta\tau = T_c/2$ | 1 | 1 | 1 | 1 | 1 | 1 |
| $\Delta\tau = T_c/4$ | 1 | 1 | 1 | 1 | 1 | 1 |
| $\Delta\tau = T_c/8$ | 1 | 0.97 | 0.93 | 0.87 | 0.80 | 0.14 |

TABLE 3

$P_d$ for different values of $E_c/N_o$ and $\Delta\tau$ for R = ∞ dB, M = 128 and $\beta = 0.0042$

| $E_c/N_o$ (dB) | −10 | −12 | −14 | −16 | −18 | −20 |
|---|---|---|---|---|---|---|
| $\Delta\tau = T_c$ | 0 | 0 | 0 | 0 | 0 | 0 |
| $\Delta\tau = T_c/2$ | 0 | 0 | 0 | 0 | 0 | 0 |
| $\Delta\tau = T_c/4$ | 0 | 0 | 0 | 0 | 0 | 0 |
| $\Delta\tau = T_c/8$ | 0 | 0 | 0 | 0 | 0 | 0 |

TABLE 4

$P_d$ for different values of $E_c/N_o$ and M for R = 0 db, $\Delta\tau = T_c/4$ and $\beta = 0.0042$

| $E_c/N_o$ (dB) | −10 | −12 | −14 | −16 | −18 | −20 |
|---|---|---|---|---|---|---|
| M = 16 | 0.41 | 0.43 | 0.33 | 0.32 | 0.26 | 0.24 |
| M = 32 | 0.99 | 0.99 | 0.98 | 0.98 | 0.96 | 0.95 |
| M = 64 | 1 | 1 | 1 | 1 | 1 | 0.99 |
| M = 128 | 1 | 1 | 1 | 1 | 1 | 1 |

TABLE 5

$P_d$ for different values of $E_c/N_o$ and M for R = ∞ db, $\Delta\tau = T_c/4$ and $\beta = 0.0042$

| $E_c/N_o$ (dB) | −10 | −12 | −14 | −16 | −18 | −20 |
|---|---|---|---|---|---|---|
| M = 16 | 0 | 0 | 0 | 0 | 0 | 0 |

TABLE 5-continued $P_d$ for different values of $E_c/N_o$ and M for
$R = \infty$ db, $\Delta\tau = T_c/4$ and $\beta = 0.0042$

| $E_c/N_o$ (dB) | −10 | −12 | −14 | −16 | −18 | −20 |
|---|---|---|---|---|---|---|
| M = 32 | 0 | 0 | 0 | 0 | 0 | 0 |
| M = 64 | 0 | 0 | 0 | 0 | 0 | 0 |
| M = 128 | 0 | 0 | 0 | 0 | 0 | 0 |

What is claimed is:

1. A method for resolving multipath components of a signal of interest, comprising:
   applying a received signal to a matched filter bank and generating matched filter outputs;
   obtaining a power delay profile of the received signal from said matched filter outputs;
   determining a first cost as a function of the power delay profile;
   determining a second cost as a function of the matched filter outputs;
   determining a difference between the first and second costs;
   comparing said difference to a threshold to obtain a threshold comparison; and
   detecting the existence of multipath components as a function said threshold comparison.

2. A method as recited in claim 1, further comprising estimating multipath delays associated with detected multipath components.

3. A method as recited in claim 1, wherein said first cost is determined by adding the values of the power delay profile corresponding to a range of delay indices.

4. A method as recited in claim 1, wherein said second cost determined by summing time averaged products of the matched filter outputs.

5. A method as recited in claim 1, further comprising terminating said method if no multipath components are detected.

6. A method as recited in claim 1, further comprising estimating multipath delays and recursively repeating said detecting step around a delay of an earliest detected multipath component.

7. A method for resolving multipath components of a signal of interest, comprising:
   applying a received signal to a matched filter bank and generating matched filter outputs;
   obtaining a power delay profile of the received signal from said matched filter outputs;
   determining a first cost by adding the values of the power delay profile corresponding to a range of delay indices;
   determining a second cost by summing time averaged products of the matched filter outputs;
   determining a difference between the first and second costs;
   comparing said difference to a threshold to obtain a threshold comparison;
   detecting existence of multipath components as a function said threshold comparison; and
   estimating multipath delays associated with detected multipath components.

8. A method as recited in claim 7, further comprising terminating said method if no multipath components are detected.

9. A method as recited in claim 7, further comprising estimating multipath delays and recursively repeating said detecting step around a delay of an earliest detected multipath component.

10. A method for resolving multipath components of a signal of interest, comprising:
    applying a received signal to a matched filter bank and generating matched filter outputs; and
    estimating multipath components from said matched filter output with an adaptive filter, said adaptive filter having a weight vector;
    applying successive projections to the adaptive filter weight vector $h_r$ at every iteration, wherein said successive projections are based on the combination of information obtained by
    (i) extracting, by non-coherently averaging the output of the matched filter bank, information about the channel region of support and maximum amplitude,
    (ii) detecting the existence of overlapping multipath components and estimating their number, and
    (iii) estimating the detected multipath components time and amplitude of arrival by transforming the output of the matched filter bank into the frequency domain to obtain a three dimensional power-delay-frequency profile; and
    successively projecting the adaptive filter weight vector on the set of all possible elements satisfying the constraints obtained from steps (i) through (iii), iterating the adaptive filter weight vector until it reaches steady state, and averaging the weight vector non-coherently.

11. A method as recited in claim 10, further comprising obtaining time and amplitude of arrival of a prompt ray from the output of the non-coherent averaging.

12. A method as recited in claim 10, wherein each filter in said matched filter bank has a different delay.

13. A method as recited in claim 10, wherein the received signal is multiplied by locally generated replica of a pulse-shaped transmitted sequence at various values of delay.

14. An apparatus for resolving multipath components of a signal of interest, comprising:
    a matched filter bank configured for filtering a received signal and generating matched filter outputs;
    a non-coherent averaging stage configured for obtaining a power delay profile of the received signal from said matched filter outputs; and
    means for carrying out the operations of
    determining a first cost as a function of the power delay profile;
    determining a second cost as a function of the matched filter outputs;
    determining a difference between the first and second costs;
    comparing said difference to a threshold to obtain a threshold comparison; and
    detecting the existence of multipath components as a function said threshold comparison.

15. An apparatus as recited in claim 14, further comprising means for estimating multipath delays associated with detected multipath components.

16. An apparatus as recited in claim 14, wherein said first cost is determined by adding the values of the power delay profile corresponding to a range of delay indices.

17. An apparatus as recited in claim 14, wherein said second cost determined by summing time averaged products of the matched filter outputs.

18. An apparatus as recited in claim 14, further comprising programming for carrying out the operation of recursively repeating said detecting step around a delay of an earliest detected multipath component.

19. An apparatus for resolving multipath components of a signal of interest, comprising:

a matched filter bank configured for filtering a received signal and generating matched filter outputs;

a non-coherent averaging stage configured for obtaining a power delay profile of the received signal from said matched filter outputs; and means for carrying out the operations of determining a first cost by adding the values of the power delay profile corresponding to a range of delay indices;

determining a second cost by summing time averaged products of the matched filter outputs;

determining a difference between the first and second costs;

comparing said difference to a threshold to obtain a threshold comparison;

detecting the existence of multipath components as a function said threshold comparison; and estimating multipath delays associated with detected multipath components.

20. An apparatus as recited in claim 19, further comprising means for carrying out the operations of estimating multipath delays and recursively repeating said previously presented detecting operation around a delay of an earliest detected multipath component.

21. An apparatus for resolving multipath components of a signal of interest, comprising:

a matched filter bank configured for filtering a received signal and generating matched filter outputs;

an adaptive filter configured for estimating multipath components from said matched filter output, said adaptive filter having a weight vector; and means for carrying out the operations of applying successive projections to the adaptive filter weight vector at every iteration, wherein said successive projections are based on the combination of information obtained by (i) extracting, by non-coherently averaging the output of the matched filter bank, information about the channel region of support and maximum amplitude, (ii) detecting the existence of overlapping multipath components and estimating their number, and (iii) estimating the detected multipath components time and amplitude of arrival by transforming the output of the matched filter bank into the frequency domain to obtain a three dimensional power-delay-frequency profile; and successively projecting the adaptive filter weight vector on the set of all possible elements satisfying the constraints obtained from steps (i) through (iii), iterating the adaptive filter weight vector until it reaches steady state, and averaging the weight vector non-coherently.

22. An apparatus as recited in claim 21, further comprising means for obtaining time and amplitude of arrival of a prompt ray from the output of the non-coherent averaging.

23. An apparatus as recited in claim 21, wherein each filter in said bank of matched filters has a different delay.

24. An apparatus as recited in claim 21, wherein the received signal is multiplied by locally generated replica of a pulse-shaped transmitted sequence at various values of delay.

25. A method as recited in claim 21, further comprising applying a coherent averaging stage and a parallel to serial converter to the output of the matched filter bank.

26. A method as recited in claim 10, further comprising applying a coherent averaging stage and a parallel to serial converter to the output of the matched filter bank.

* * * * *